(12) United States Patent
Kieffer et al.

(10) Patent No.: US 11,364,641 B2
(45) Date of Patent: Jun. 21, 2022

(54) GRIPPING DEVICE

(71) Applicant: ONROBOT A/S, Odense SØ (DK)

(72) Inventors: Lasse Kieffer, Odense C (DK); Peter Nadolny Madsen, Tommerup (DK); Henrik Tillitz Hansen, Nyborg (DK)

(73) Assignee: ONROBOT A/S, Odense SØ (DK)

( * ) Notice: Subject to any disclaimer, the term of this patent is extended or adjusted under 35 U.S.C. 154(b) by 26 days.

(21) Appl. No.: 16/900,911

(22) Filed: Jun. 13, 2020

(65) Prior Publication Data
US 2021/0162610 A1    Jun. 3, 2021

Related U.S. Application Data

(63) Continuation of application No. PCT/DK2018/050287, filed on Nov. 7, 2018.

(30) Foreign Application Priority Data

Dec. 14, 2017   (DK) ............................ PA 2017 00710
Apr. 6, 2018    (DK) ............................ PA 2018 00149

(51) Int. Cl.
*B25J 15/04*  (2006.01)
*B25J 15/00*  (2006.01)
*B25J 15/06*  (2006.01)

(52) U.S. Cl.
CPC ....... *B25J 15/0441* (2013.01); *B25J 15/0061* (2013.01); *B25J 15/0625* (2013.01); *B25J 15/0616* (2013.01)

(58) Field of Classification Search
CPC ................ B25J 15/0441; B25J 15/0625; B25J 15/0061; B25J 15/0616; B25J 15/0408
See application file for complete search history.

(56) References Cited

U.S. PATENT DOCUMENTS

| | | | |
|---|---|---|---|
| 8,496,425 B2 * | 7/2013 | Lin ...................... | B25J 15/0061 414/729 |
| 9,199,375 B2 * | 12/2015 | Miyoshi ................. | B25J 9/1612 |
| 2001/0045755 A1 * | 11/2001 | Schick ................. | B25J 15/0061 294/65 |
| 2006/0088367 A1 | 4/2006 | Dellach et al. | |
| 2012/0279602 A1 * | 11/2012 | Lin ........................ | H02G 11/00 138/109 |

(Continued)

FOREIGN PATENT DOCUMENTS

| CN | 206529037 U | 9/2017 |
|---|---|---|
| DE | 4215106 C1 | 6/1993 |

(Continued)

OTHER PUBLICATIONS

International Patent Application No. PCT/DK2018/050287, International Search Report (ISR) and Written Opinion dated Apr. 15, 2019—4 pages.

(Continued)

*Primary Examiner* — Stephen A Vu
(74) *Attorney, Agent, or Firm* — Lathrop GPM LLP

(57) ABSTRACT

A gripping device (2) configured to be detachably attached to a robot (20). The gripping device (2) comprises one or more extremities (10, 10') provided with one or more suction members (12, 12') connected to a vacuum source (18). At least two of the extremities (10, 10') are rotatably arranged with respect to each other.

11 Claims, 11 Drawing Sheets

(56) References Cited

U.S. PATENT DOCUMENTS

| | | | |
|---|---|---|---|
| 2014/0197652 A1 | 7/2014 | Wang et al. | |
| 2014/0356049 A1* | 12/2014 | Lin | B25J 15/0616 |
| | | | 403/59 |
| 2016/0089780 A1* | 3/2016 | Marttinen | B25J 9/02 |
| | | | 74/490.03 |
| 2016/0236357 A1 | 8/2016 | Kalb et al. | |
| 2017/0348861 A1 | 12/2017 | Kikuchi et al. | |

FOREIGN PATENT DOCUMENTS

| | | |
|---|---|---|
| DE | 198 17 426 A1 | 10/1999 |
| DE | 10 2010 054739 A1 | 6/2012 |
| EP | 2 617 535 A2 | 7/2013 |
| WO | WO 9612137 A1 | 4/1996 |
| WO | WO 2006/001762 A1 | 1/2006 |
| WO | WO 2017/040803 A1 | 3/2017 |

OTHER PUBLICATIONS

Danish Patent Application No. PA 2017 00710, Search Report completed May 1, 2018—4 pages.
Danish Patent Application No. PA 2018 00149, Search Report completed Jul. 18, 2018—3 pages.

* cited by examiner

Fig. 4A
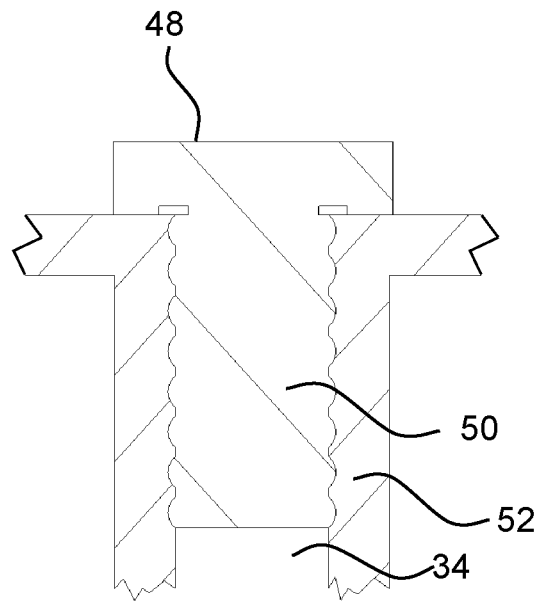
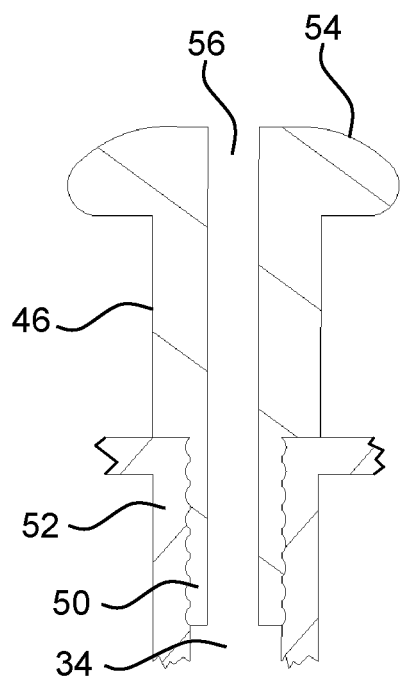
Fig. 4B

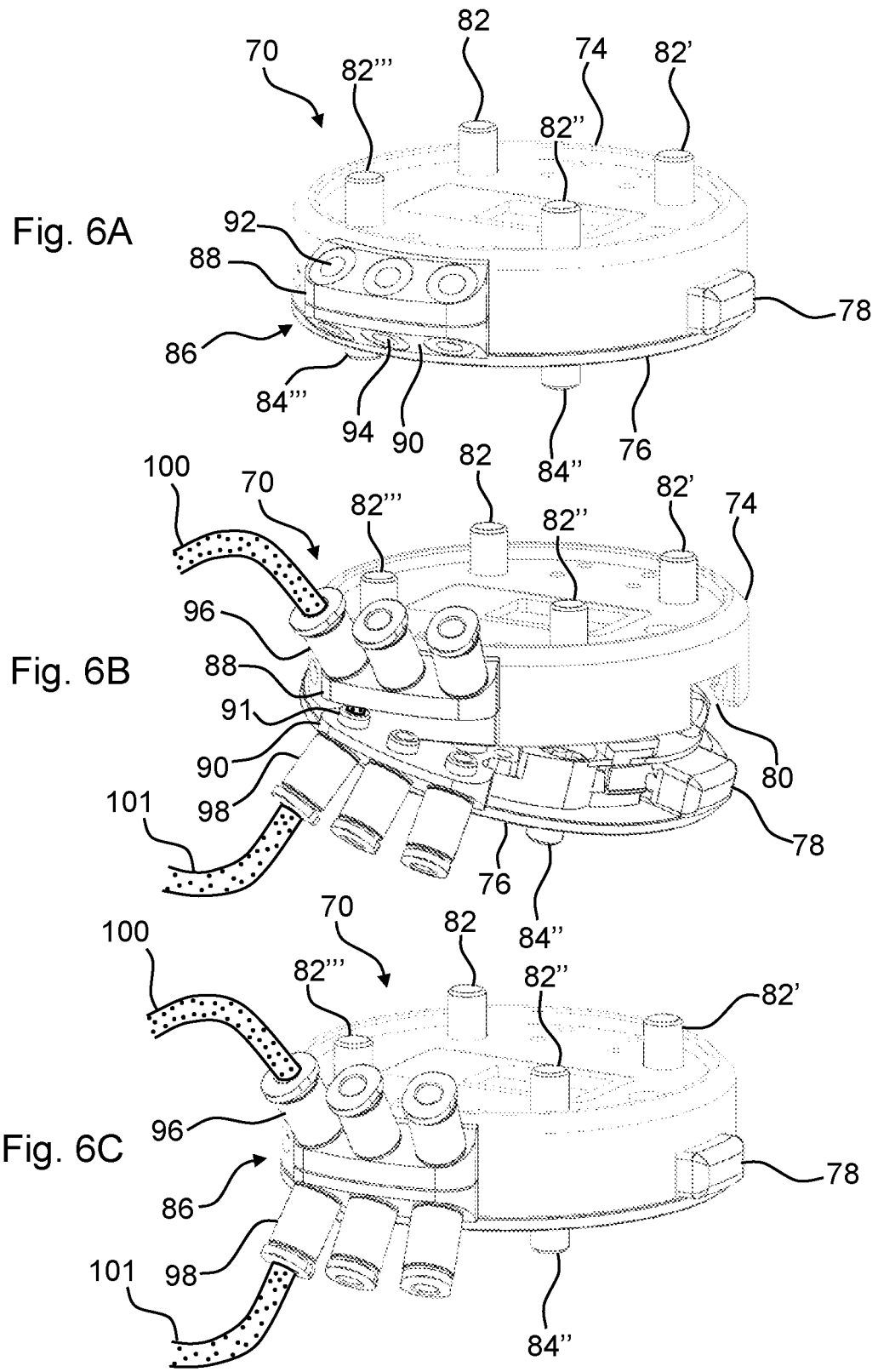

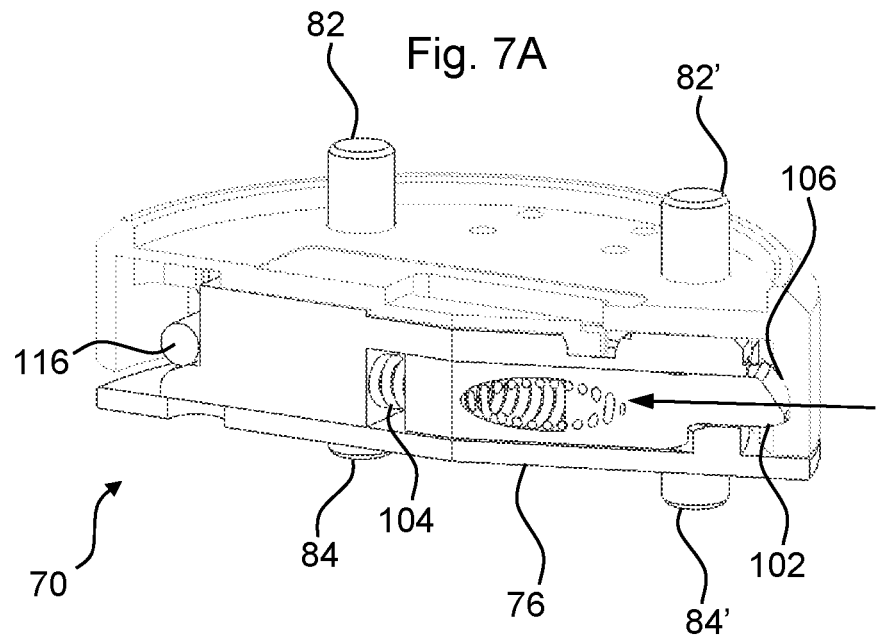
Fig. 7A
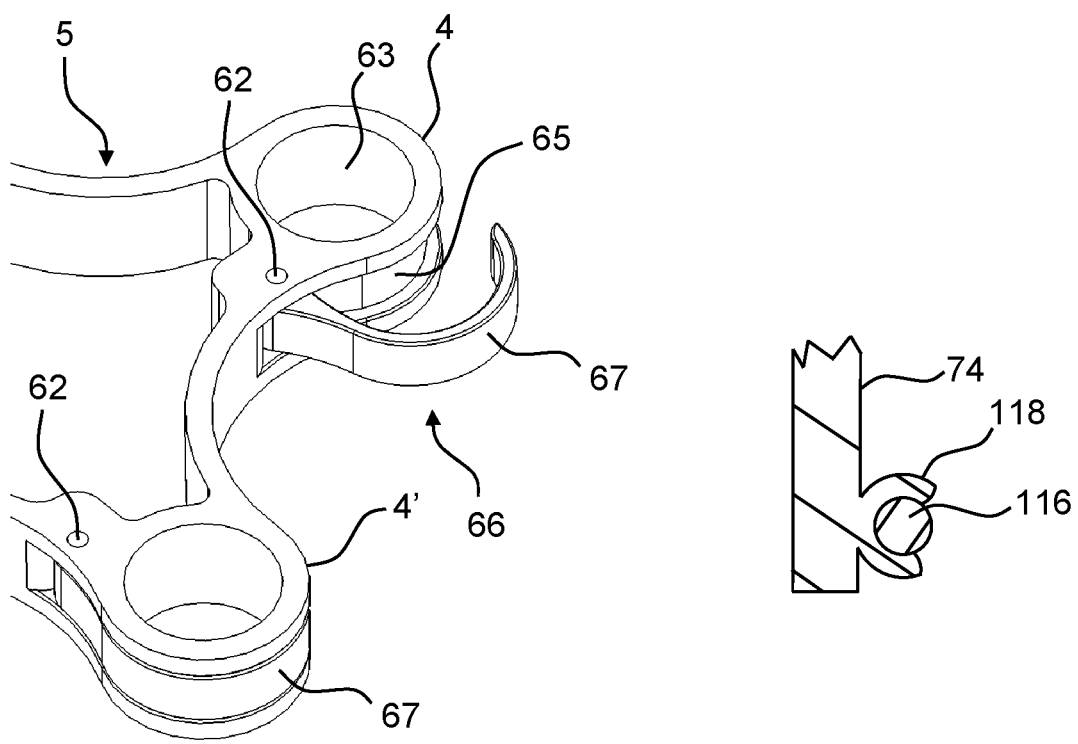
Fig. 7B
Fig. 7C

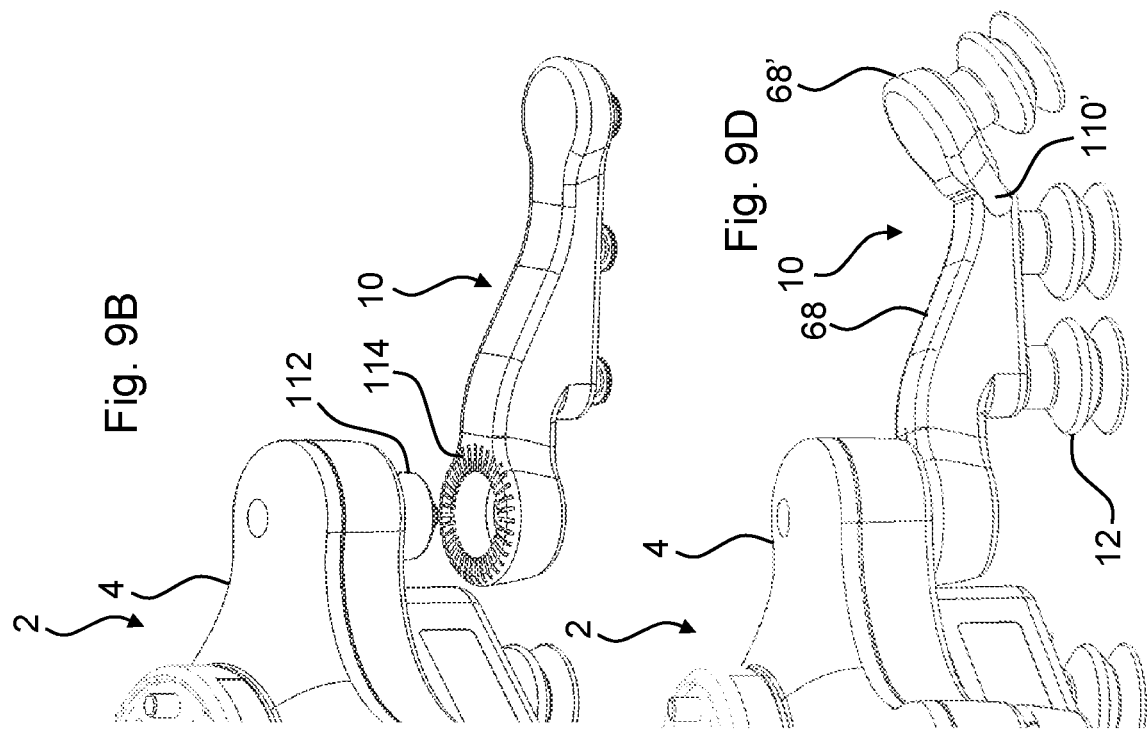
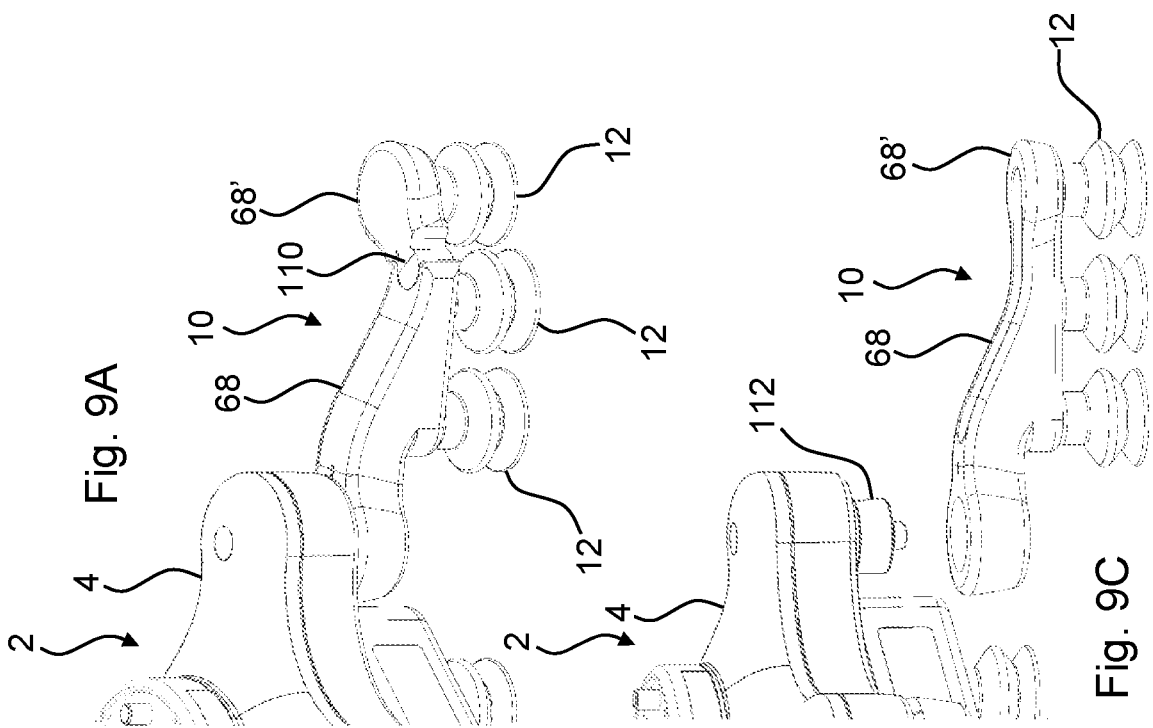

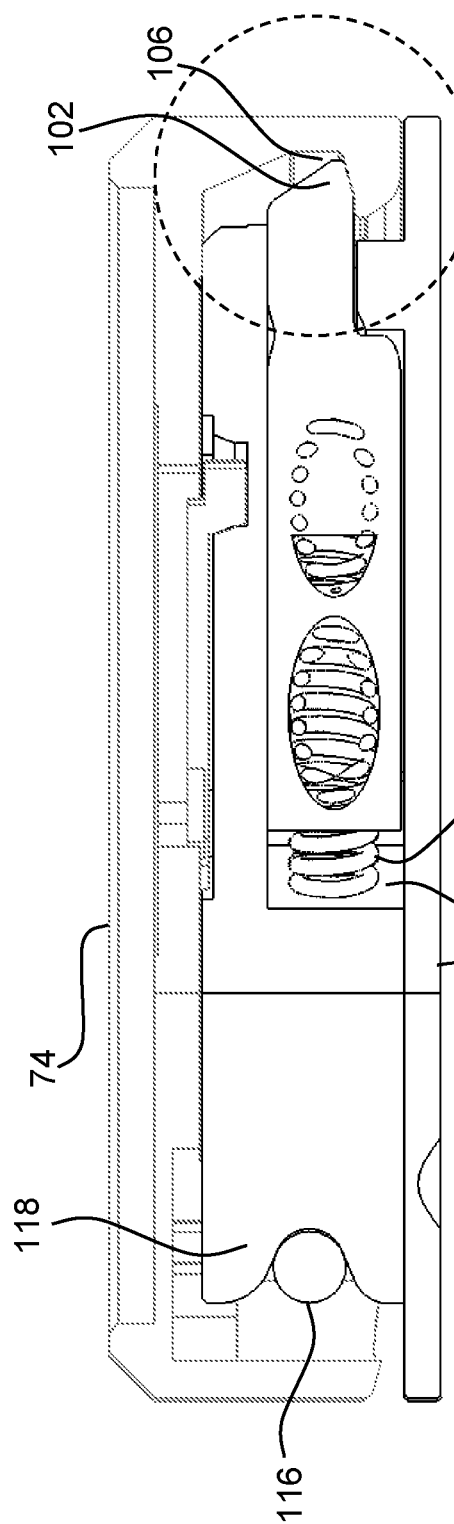
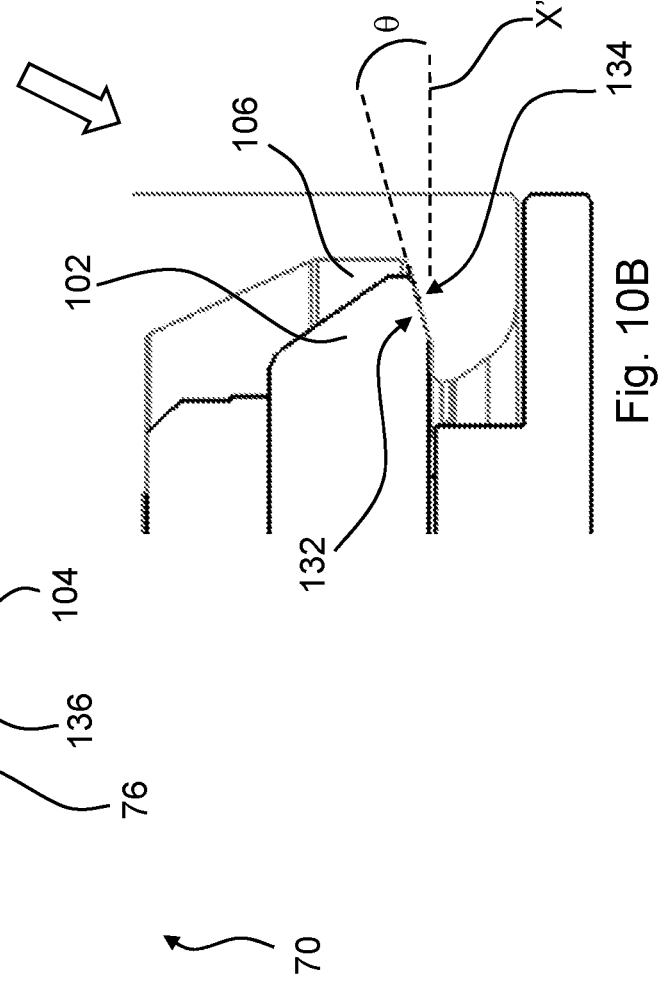

GRIPPING DEVICE

CROSS-REFERENCE TO RELATED APPLICATIONS

This application is a continuation of International Patent Application No. PCT/DK2018/050287, filed Nov. 7, 2018, which claims the benefit of priority to Danish Patent Application No. PA 2017 00710 filed Dec. 14, 2017, and Danish Patent Application No. PA 2018 00149 filed Apr. 6, 2018, each of which is incorporated herein by reference in its entirety.

FIELD OF INVENTION

The present invention relates to a gripping device configured to be applied when using a robot. The present invention more particularly relates to vacuum type gripping device configured to be attached to a robot, e.g. a collaborative robot.

PRIOR ART

Robots are more and more frequently introduced in new working areas. A group of robots being referred to as collaborative robots, are robots intended to physically interact with humans in a shared workspace. When collaborative robots are applied for gripping and handling objects, a gripping device connected to an external vacuum source (a compressor or a pump) is typically applied.

It is, however, time consuming both to connect an externally arranged vacuum source to the gripping device, connect the gripping device to the robot and connect a controlling device to the gripping device. Accordingly, it would be desirable to be able to have a simple and less demanding gripping device.

Moreover, many vacuum type gripping devices for robots can only be applied to handle objects in a limited size range. Therefore, it would be desirable to have a gripping device capable of handling objects in a larger size range.

US2014197652A1 discloses an end effector module includes a palm base and robotic fingers extended from the palm base. Each robotic finger is composed of four joint shafts pivotally coupled with one another. Each robotic finger is able to adjust the position of the suction device of the end joint shaft through the rotation of the robotic finger and the pivotal turning of each joint shaft for bending with respect to each other, so as to move the suction device to the normal direction of a selected suction point of a surface of a clamped object and approach along the normal direction to suck the object. The end effector module comprises a plurality of gears, transmission shafts and electrical motors. Thus, the end effector module is complex, expensive and requires a control unit for being operated.

Accordingly, it would be desirable to be able to provide a less complex and cheaper gripping device that does not require a control unit for being operated.

It is an object of the present invention to provide a less complex and cheaper gripping device that does not require a control unit for being operated.

It is also an object of the present invention to provide a gripping device which reduces or even eliminates the above-mentioned disadvantages of the prior art.

It is a further object of the present invention to provide a gripping device that is simple and less demanding to use than the prior art vacuum-based gripping device for robots.

It is also an object of the present invention to provide a gripping device that is capable of handling objects in a larger size range than the prior art vacuum-based gripping devices for robots.

It is also an object of the present invention to provide a gripping device that takes up less space than the prior art vacuum-based gripping device for robots.

It is also an object of the present invention to provide a connector configured to connect a device such as a gripping device according to the invention to a robot in an easy and user-friendly manner.

SUMMARY OF THE INVENTION

The gripping device according to the invention is a gripping device configured to be detachably attached to a robot, wherein said gripping device comprises one or more extremities provided with one or more suction members connected to a vacuum source, wherein at least one of the extremities is rotatably arranged, wherein at least one of the extremities is configured to be rotated manually without using an actuator, wherein the gripping device comprises a body portion to which the extremities are moveably attached in such a manner that the friction between the engaging structures of the extremities and the corresponding structures of the body portion has a magnitude sufficiently large to ensure that the extremities cannot move relative to the body portion of the gripping device when an object is being handled by the gripping device.

Hereby, it is possible to provide a gripping device that is less complex, cheaper and that does not require a control unit for being operated. It is also possible to provide a gripping device that is simple and less demanding to use than the prior art vacuum-based gripping device for robots. It is possible to provide a gripping device that is capable of handling objects in a larger size range than the prior art vacuum-based gripping device for robots and it is possible to provide a gripping device that takes up less space than the prior art vacuum-based gripping device for robots, when the gripping tool is folded.

The gripping device is configured to be detachably attached to a robot. The attachment to the robot may be done by connecting corresponding mechanical attachment units arranged at the robot and on the gripping device, respectively. A cable or an electrical connection structure may be used to electrically connect a robot and the gripping device.

It is possible to provide a robot with a wireless transmitter unit configured to communicate with a corresponding receiver unit provided at or connected to the gripping device.

The gripping device comprises one or more extremities provided with one or more suction members connected to a vacuum source.

The extremities may be configured to grip an object from a single direction. This means that the gripping tool comprises suction members all being directed in the same direction.

The extremities may comprise one or more segments.

In one embodiment according to the invention, the gripping device comprises one or more extremities comprising two or more segments, wherein said segments are moveably attached to each other.

In one embodiment according to the invention, the gripping device comprises one or more extremities comprising two or more segments that are rotatably attached to each other. This may be done by using a hinge joint or a ball joint by way of example.

The extremities are preferably identical and arranged in a manner, in which they all are movably arranged within the same plane. Hereby, it is possible to use the gripping device to grip an object having a large basically plate-shaped structure (e.g. a plane side).

The one or more extremities are moveably arranged (e.g. with respect to each other in case that there is several extremities). Hereby, it is possible to change the extension of the gripping area in order to make the gripping device fit the object intended to be handled by using the gripping device.

The extremities are preferably moveably arranged with respect to each other, in a manner in which no parts have to be disassembled in order to change the relative position of the extremities. Hereby, it is possible to change the configuration of the gripping device (hereby adapting the gripping device to grip and handle a specific object) in a fast and user-friendly manner.

In a preferred embodiment according to the invention, the extremities are moveably arranged relative to each other within the same plane. Hereby, the gripping device is capable of handling objects that are being lifted from one side only.

In a preferred embodiment, the gripping device comprises a plurality of extremities provided with one or more suction members connected to a vacuum source, wherein at least two of the extremities are rotatably arranged with respect to each other.

It may be an advantage that one or more of the extremities are rotatably attached to a body portion of the gripping device. Hereby, it is possible to change the configuration of the extremities relative to each other in an easy and user-friendly manner. It may be possible to rotate the extremities and hereby provide a large degree of freedom. Accordingly, the gripping device can be arranged in a plurality of gripping positions and hereby it is capable of handling an object within a large range of sizes.

It may be beneficial that the gripping device comprises a body portion provided with one or more fixation portions, wherein one or more of the extremities are rotatably attached to a fixation portion. Hereby, it is possible to apply a single centrally arranged unit to provide vacuum being distributed to the extremities through canal structures and/or tube structures.

It may be beneficial that the extremities are rotatably attached by means of one or more shafts. Alternatively, the extremities may be rotatably attached to a structure of the gripping device by means of ball joints.

In a preferred embodiment according to the invention, all extremities are rotatably attached by means of an individual shaft. This means that no extremities are mounted by means of the same shaft.

In another embodiment according to the invention, the extremities are rotatably attached by means of several shafts.

In one embodiment according to the invention, the extremities are rotatably attached to rotate about the same axis of rotation. This may be achieved by attaching all extremities to a single shaft or by rotatably attaching the extremities to several shafts or joints (e.g. ball joints) having a common axis of rotation.

It may be advantageous that one or more of the extremities are provided with one or more inlets. Hereby, it is possible to provide the suction members (e.g. suction cups) in different positions. This may be an advantage in order to provide the most efficient lifting configuration.

It is possible to apply suction members (e.g. suction cups) of different sizes and types.

In a preferred embodiment according to the invention, the gripping device comprises a body portion provided with one or more (preferably several) fixation portions distributed along the circumference of the body portion.

In one embodiment according to the invention, the gripping device comprises a body portion provided with two fixation portions distributed along the circumference of the body portion.

In another embodiment according to the invention, the gripping device comprises a body portion provided with three fixation portions distributed along the circumference of the body portion.

In a further embodiment according to the invention, the gripping device comprises a body portion provided with four fixation portions distributed along the circumference of the body portion.

In an even further embodiment according to the invention, the gripping device comprises a body portion provided with five fixation portions distributed along the circumference of the body portion.

In another embodiment according to the invention, the gripping device comprises a body portion provided with six or more fixation portions distributed along the circumference of the body portion.

It may be beneficial that one or more of the extremities are provided with an air conduit being in fluid communication with one or more inlets. Hereby, it is possible to provide the vacuum in all inlets in an extremity through the same air conduit.

It may be advantageous that the gripping device comprises one or more integrated pumps. Hereby, it is possible to eliminate the need for connecting the gripping device to an external vacuum source. Thus, the gripping tool is simpler and more user-friendly.

By the term "pump" is meant any device capable of providing the pressure gradient and air flow required to provide a predefined suction force. Accordingly, the pump may e.g. be a pneumatic pump or an injector.

It is possible to integrate one or more pumps in the gripping device. The pump(s) may preferably be electrically driven.

In one embodiment according to the invention, the one or more pumps are supplied with electrical power from a battery within the griping device.

In another embodiment according to the invention, the one or more pumps are supplied with electrical power through a wired connection configured to be connected to the robot, to which the gripping device is mounted.

In a preferred embodiment according to the invention, the gripping device comprise a single pump.

In another embodiment according to the invention, the gripping device comprise two, three, four, five or more integrated pumps.

It may be an advantage that the one or more pumps are controlled by a control signal delivered by the robot. The control signal may be provided through a wired connection or wirelessly.

It may be advantageous that the gripping device comprises two or more valves configured to control the pressure at two or more separate groups of suction members. Hereby, it is possible to provide different pressure to the two or more separate groups of suction members. This may be an advantage if the gripping device is intended to be used for handling several objects at the same time. By applying different pressure at different groups of suction members, it is possible to grip different objects using different sections of the gripping device at different times.

It may be beneficial that the gripping device comprises a) a connection cable or an electrical connection structure and is configured to be controlled by a robot by means of control signals sent via said cable or electrical connection structure or b) a receiver unit and is configured to be wirelessly controlled by an external device by means of wireless control signals received from said external device.

Hereby, it is possible to control one or more pumps and/or valves integrated in the gripping device through the robot. Accordingly, the need for an external control or a control integrated in the gripping device can be omitted. Accordingly, the complexity and cost of the gripping tool can be reduced.

It may be an advantage that the gripping device comprises an adjustment member for adjusting the friction between engaging structures of the extremities and corresponding structures of that part of the gripping device to which the extremities are moveably attached. Hereby, it is possible to adjust the friction and thus ensure that the friction is sufficiently large to ensure that the extremities do not move relative to each other during use.

In one embodiment according to the invention, the gripping device comprises an adjustment member formed as a mounted adjustment screw. Hereby, it is possible to provide an adjustment member that is fast and easy to use.

It may be an advantage that the gripping device comprises one or more inlets provided with a threaded structure. Hereby, it is possible to attach one or more elements in the one or more inlets.

In a preferred embodiment according to the invention, the gripping device comprises one or more inlets provided with outer treads. Hereby, it is possible to attach a closure, a suction member or an extension member provided with an inner thread configured to receive inlets provided with outer treads.

In a preferred embodiment according to the invention, the gripping device comprises one or more inlets provided with inner treads. Hereby, it is possible to attach a closure (that sealingly closes an inlet), a suction member or an extension member provided with an outer thread configured to be received by one inlet provided with inner treads.

It may be advantageous that the gripping device comprises a body portion to which the extremities are moveably attached in such a manner that the friction between the engaging structures of the extremities and the corresponding structures of the body portion has a magnitude sufficiently large to ensure that the extremities cannot move relative to the body portion of the gripping device when the object(s) are being handled by the gripping device. At the same time, it is required that the friction is selected below a predefined level in order to enable the person adjusting the gripping device configuration to change the relative position of the extremities of the gripping device without using any tool.

Hereby, it is possible to ensure that the extremities maintain their relative configuration during use of the gripping device. Moreover, the extremities can be moved relative to each other manually. Accordingly, the configuration of the extremities of the gripping device can be manually adjusted.

In one embodiment according to the invention, the gripping device comprises one or more locking structures configured to prevent an extremity from being rotated. The one or more locking structures may preferably be configured to be arranged in an unlocked configuration and in a locked configuration.

In one embodiment according to the invention, the gripping device comprises first engaging structures of the body portion and corresponding engaging structures of the extremities, wherein the engaging structures of the body portion and the extremities are configured to click the extremities into a plurality of fixed positions in which the extremities cannot be rotated further during a predefined use of the gripping device. The plurality of fixed positions may preferably be basically evenly distributed along an angular range representing the range of motion of the extremities.

In one embodiment according to the invention, the corresponding structures of the body portion have a magnitude sufficiently large to ensure that the extremities cannot move relative to the body portion of the gripping device when the object(s) are being handled by the gripping device.

In one embodiment according to the invention, the gripping device comprises one or more sensors configured to detect the position and/or orientation of one or more of the extremities. It may be an advantage that the one or more sensors are configured to detect the position and/or orientation of one or more of the extremities relative to the body portion.

It may be an advantage that the gripping device comprises a locking structure comprising an arm rotatably attached to a fixation portion of a body portion. The locking structure is preferably configured to be arranged in an unlocked configuration in which the arm protrudes from the fixation portion, wherein in this unlocked configuration, an extremity can be inserted into or be removed from a hole in the fixation portion, wherein in the unlocked configuration, an extremity can also be rotated hereby changing its position relative to the body portion and thus the other extremities.

The locking structure can be arranged in a locked configuration, in which the bent arm is received by the groove structure provided in the fixation portion. In this locked configuration, the extremity cannot be rotated and thus its position relative to the body portion cannot be changed.

It may be beneficial that the gripping device comprises a support portion, wherein the extremities are separated from the support portion, wherein the support portion constitutes a housing configured to contain a pump. Hereby, it is possible to apply the support portion as an active gripping part (provided with suction members) and at the same time use the support portion as a housing, into which a pump can be integrated.

It is beneficial that the extremities are configured to be manually moved relative to each other. Hereby, it is possible to change the configuration of the gripping device manually.

The connector according to the invention comprises a first portion configured to be attached to a robot and a second portion configured to be attached to a gripping device according to the invention. The second portion may be configured to be attached to another device configured to be coupled to a robot.

In one embodiment according to the invention, the connector comprises one or more screws protruding from a base structure of the first portion of the connector, wherein said screws are adapted to be screwed into corresponding threaded holes in the robot.

In one embodiment according to the invention, the connector comprises one or more screws protruding from a base structure of the second portion of the connector, wherein said screws are adapted to be screwed into corresponding threaded holes in a gripping device or another device configured to be used by the robot.

It is possible to have one or more connection pipes protruding from the base structure of the second portion of the connector extend in extension of each other in a pairwise manner so that there is access through the connector through the corresponding connection pipes.

Hereby, electrical connections such as wires, cables with multiple wires and cables or tubes may be connected through the connection pipes.

The first portion and the second portion are provided with corresponding engagement structures constituting a snap-fit connection.

Hereby, it is possible to enable an easy, fast and user-friendly attachment and detachment of e.g. a gripping device to a robot.

The connector comprises a slideably arranged press element arranged to unlock the engagement structures from each other by pressing the element. Hereby, the press element can be used to bring the engagement structures in a relative configuration in which the connector can disassemble. This is important when the connector has to be split into the first portion and the second portion.

The connector may alternatively comprise a slideably arranged pull element arranged to unlock the engagement structures from each other by pulling the pull element. Hereby, the first portion and the second portion may be brought out of engagement by means of the pull element.

The connector may comprise a rotatably arranged rotation element that is arranged to unlock the engagement structures from each other by rotating the rotation element. Hereby, the first portion and the second portion may be brought out of engagement by means of the rotation element.

In a preferred embodiment, the connector comprises a detachably attached adaptor comprising a first part and a second part, wherein the adapter is configured to establish a connection between the robot and the gripping device (or alternatively another device) that is (or is to be) connected to the robot.

It may be an advantage that the first part is provided with one, two, three or more holes extending through the first part and further extending through corresponding structures of the second part that hereby constitutes the hole(s).

The adaptor is adapted to connect pipes, wires or cables with multiple wires from the robot and the device being attached to the robot by means of the connector. Thus, by means of the adaptor, it is possible to connect electrical connections by using electrical wires, cables with multiple wires or tubes (e.g. air tubes) between the robot and the device.

It may be an advantage that the connector is configured to receive several adaptors being detachably attached to the connector.

The adaptor may comprise connection structures enabling that adjacent pipe ends, or adjacent cable ends or electrical connection elements can be connected. Hereby it is possible to apply the adaptor to establish connection between single wires, cables with multiple wires or pipes from the robot and the gripping device or an alternative device, respectively.

It may be advantageous that the first portion and the second portion are detachably attached to each other by means of a hinge comprising a pivot and an engagement structure rotatably attached thereto.

It may be beneficial that a slot is provided in the outer structure of the first portion, wherein the slot is configured to receive a press element, a rotation element or a pull element protruding from the second portion.

Alternatively, a slot is provided in the outer structure of the second portion, wherein the slot is configured to receive a press element, a rotation element or a pull element protruding from the first portion.

It may be an advantage that the press element is slideably arranged in a manner in which corresponding engagement structures of the first portion and the second portion, respectively, are brought out of engagement upon pressing and hereby sliding the press element.

It may be beneficial that the pull element is slideably arranged in a manner in which corresponding engagement structures of the first portion and the second portion, respectively, are brought out of engagement upon pulling and hereby sliding the press element.

It may be beneficial that the rotating element is rotatably arranged in a manner in which corresponding engagement structures of the first portion and the second portion, respectively, are brought out of engagement upon rotation of the rotation element.

It may be advantageous that the first portion comprises a protruding structure that is configured to be brought into engagement with a corresponding receiving recess provided in the second portion. Hereby, it is possible to provide a mechanical locking structure.

Alternatively, the second portion may comprise a protruding structure that is configured to be brought into engagement with a corresponding receiving recess provided in the first portion. Hereby, it is possible to provide a mechanical locking structure.

The protruding structure may be a part of a slidably arranged press element provided in a track structure.

It may be beneficial that a spring is arranged in the end portion of the track structure and exerts an outwardly directed force on the press element. Hereby, the press element is kept in lockingly engagement with the receiving recess until the force is exceeded by an opposing directed force applied to press the press element into (e.g. in a direction towards the central portion of) the connector. Hereby, the protruding structure will be moved radially inwards and the protruding structure will be brought out of engagement with the receiving recess.

It may be an advantage that the first portion and the second portion are detachably attached to each other by means of a hinge comprising a pivot and a joint structure rotatably and detachably attached to the pivot.

It may be an advantage that the first portion comprises a detachably attached plate allowing mounting of an adaptor. Hereby, the plate can be removed in case that an adaptor is intended to be detachably attached to the first portion of the connector.

Alternatively, the second portion comprises a detachably attached plate allowing mounting of an adaptor. Hereby, the plate can be removed in case that an adaptor is intended to be detachably attached to the second portion of the connector.

It may be an advantage that the first portion comprises a base and an outer wall extending thereof, wherein the outer wall has a cylindrical shape. The outer wall may have a circular cross section. In another embodiment, the cross section of the outer wall is rectangular (e.g. square). The second portion may preferably comprise a receiving portion configured and shaped to receive the outer wall of the first portion. Alternatively, the second portion may comprise a base and an outer wall extending thereof, wherein the outer wall has a cylindrical shape. The outer wall may have a circular cross section. In another embodiment, the cross section of the outer wall is rectangular (e.g. square). The first portion may preferably comprise a receiving portion configured and shaped to receive the outer wall of the second portion.

DESCRIPTION OF THE DRAWINGS

The invention will become more fully understood from the detailed description given herein below. The accompanying drawings are given by way of illustration only, and thus, they are not limitative of the present invention. In the accompanying drawings:

FIG. 4A shows a cross-sectional view of a closure used to close an inlet hole in an extremity of a gripping device according to the invention;

FIG. 4B shows a cross-sectional view of an extension member attached to an inlet hole in an extremity of a gripping device according to the invention;

FIG. 6A shows a connector according to the invention in closed configuration;

FIG. 6B shows the connector shown in FIG. 6A in an open configuration, in which an air tube extends through an adaptor integrated in the connector;

FIG. 6C shows the connector shown in FIG. 6B in a closed configuration;

FIG. 7A shows a cross-sectional view of a connector according to the invention;

FIG. 7B shows a locking structure according to the invention;

FIG. 7C shows an engagement structure of a first portion rotatably attached to a pivot of a second portion of a connector;

FIG. 9A shows a segmented extremity according to the invention;

FIG. 9B shows another extremity according to the invention;

FIG. 9C shows a segmented extremity according to the invention in a first straight configuration;

FIG. 9D shows the segmented extremity shown in FIG. 9C in another bent configuration;

FIG. 10A shows a cross-sectional view of a connector according to the invention;

FIG. 10B shows a close-up view of a portion of the connector shown in FIG. 10A

DETAILED DESCRIPTION OF THE INVENTION

Figure 1A:
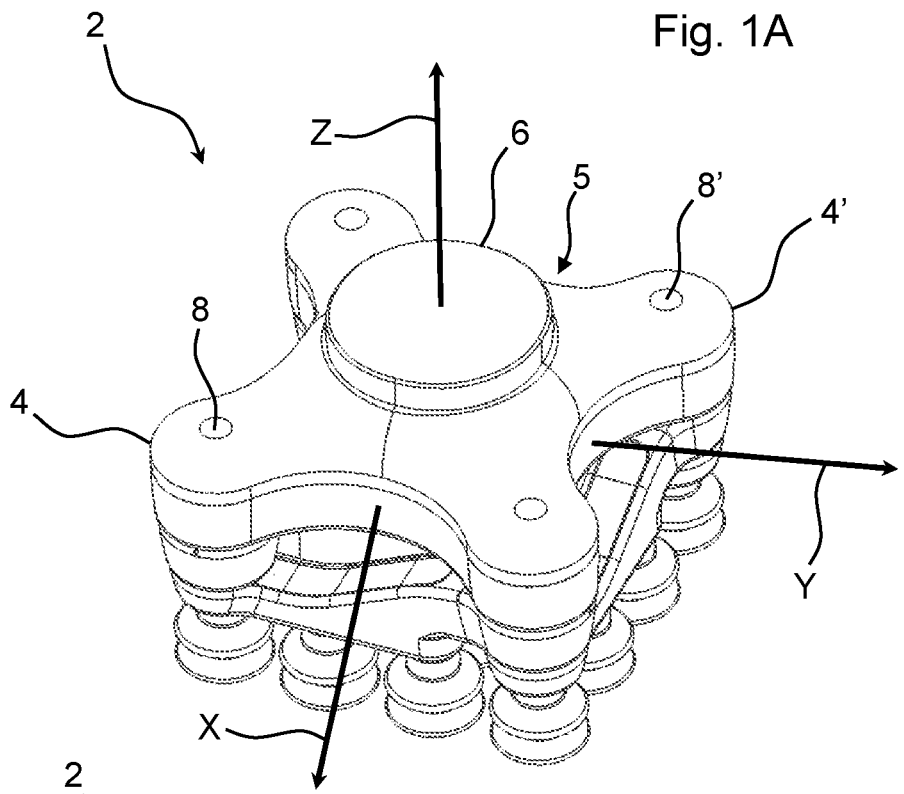
FIG. 1A shows a perspective top view of a gripping device according to the invention in a folded configuration.

Referring now in detail to the drawings for the purpose of illustrating preferred embodiments of the present invention, a gripping device 2 of the present invention is illustrated in FIG. 1A.

Figure 1B:
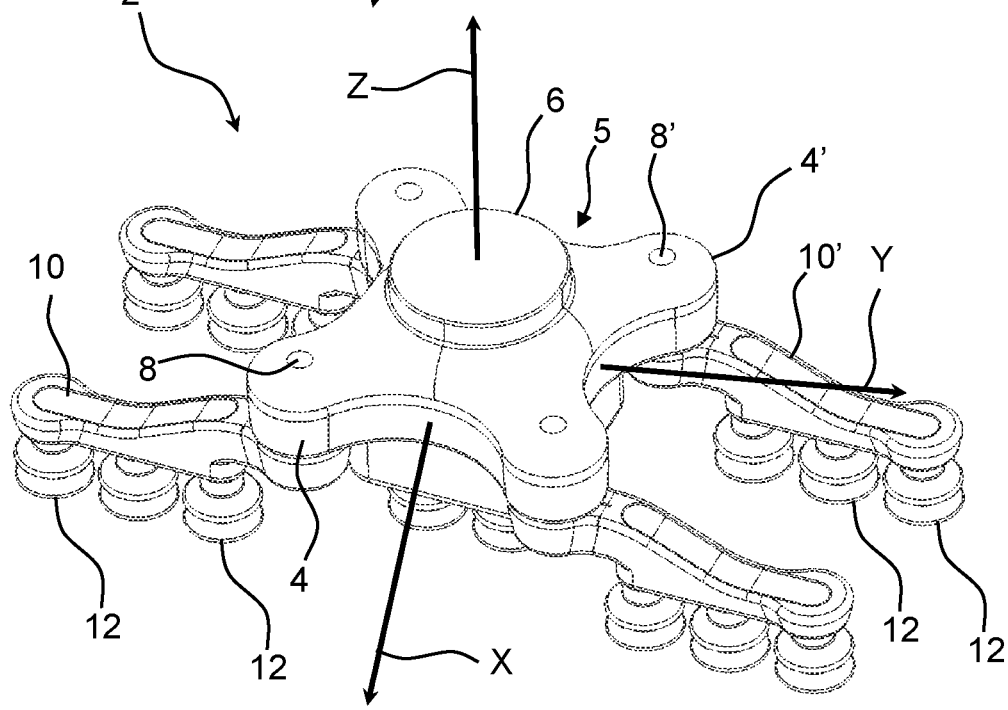
FIG. 1B shows a perspective top view of the gripping device shown in FIG. 1A in an unfolded configuration.

FIG. 1A illustrates a perspective top view of a gripping device 2 according to the invention in a folded configuration, whereas FIG. 1B illustrates a perspective top view of the gripping device 2 shown in FIG. 1A in an unfolded configuration. The gripping device 2 comprises a body portion 5 provided with four fixation portions 4, 4' evenly distributed along the circumference of the body portion 5. Accordingly, the four fixation portions 4, 4' constitute four corner structures of the body portion 5. The gripping device 2 has a longitudinal axis Z, a first lateral axis X extending perpendicular to the longitudinal axis Z and a second lateral axis Y extending perpendicular to the longitudinal axis Z and the first lateral axis X.

Each fixation portion 4, 4' is used for moveable attachment of an extremity 10, 10'. Accordingly, the gripping device 2 comprises four moveably attached extremities 10, 10'.

Each extremity 10, 10' is rotatably attached to a corresponding fixation portion 4, 4' of the body portion 5 of the gripping device 2. Thus, the gripping device 2 comprises four rotatably attached extremities 10, 10'.

The extremities 10, 10' are rotatably attached to the fixation portions 4, 4' of the body portion 5 by means of a shaft 8, 8' extending parallel to the longitudinal axis Z. Accordingly, the extremities 10, 10' are configured to rotate about the longitudinal axis Z.

It may be possible to rotatably attach the extremities 10, 10' to the fixation portions 4, 4' of the body portion 5 by means of ball joints as an alternative to shafts. In an embodiment, in which the extremities 10, 10' are rotatably attached to the fixation portions 4, 4' of the body portion 5 by means of ball joints, the extremities 10, 10' may also be rotated about the a first lateral axis X and/or the second lateral axis Y.

The gripping device 2 comprises a pump (not shown) arranged inside the body portion 5. The pump is preferably an electrically driven pump that is capable of providing a vacuum (negative pressure relative to the ambient pressure) that can be applied for providing a force sufficiently large for gripping and holding an object by means of a number of suction members 12, 12' provided at the extremities 10, 10' of the gripping device 2. The suction members 12, 12' are formed as detachably attached suction discs. The suction discs may be adapted to fit specific gripping purposes. It is possible to replace the suction discs with smaller ones, larger ones or ones of different type, if desired. Accordingly, by applying the gripping device 2 according to the invention, it is possible to provide individualized solutions in order to match specific requirements.

Figure 2A:
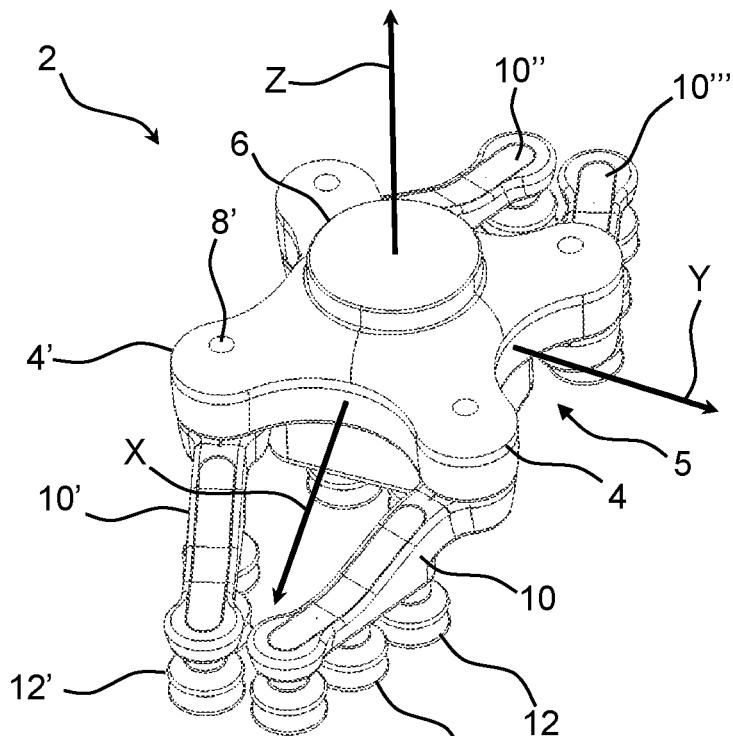
FIG. 2A shows a perspective top view of the gripping device shown in FIG. 1A in another configuration.
Figure 2B:
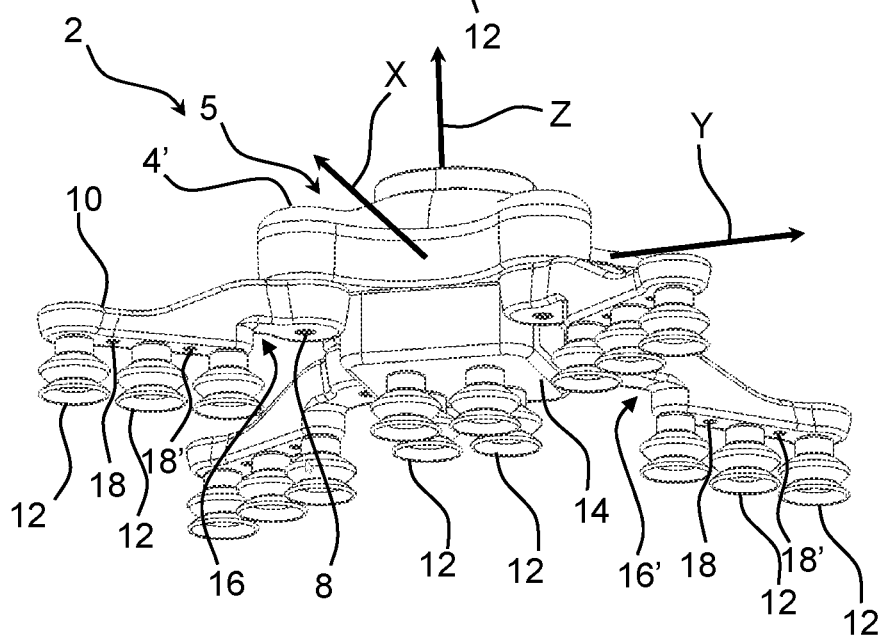
FIG. 2B shows a perspective bottom view of the gripping device shown in FIG. 1A in a configuration, in which the extremities extend perpendicular to their adjacent extremity.

Each extremity 10, 10' is provided with a plurality of inlets (see FIG. 2B). In another embodiment, however, each extremity 10, 10' may be provided with a single inlet. Each suction 12, 12' is connected to an inlet being in fluid communication with the internal pump of the gripping device 2. Accordingly, the gripping device 2 does not require that an external suction source is connected to the gripping device 2.

The gripping device 2 comprises a cable or an electrical connection structure (not shown) provided with a plug configured to be connected to a corresponding electrical socket arranged on a robot, to which the gripping device 2 is being attached. The robot will provide electrical power to the pump integrated in the gripping device 2. Furthermore, the robot delivers a control signal to the pump and a number of valves arranged in the gripping device 2.

Hereby, the robot can control the pump and the valve(s) of the gripping device 2 through the cable or the electrical connection structure.

In one embodiment according to the invention, the robot may control the gripping device 2 wirelessly by means of a transmitter unit being part of the robot or connected to the robot. The wireless signals transmitted by the transmitter may be received by a receiver being an integrated part of the gripping device 2 or being connected thereto.

In one embodiment according to the invention, the pump integrated in the gripping device 2 is electrically driven by means of a battery arranged in the gripping device 2 or connected thereto.

The extremities 10, 10' are configured to be manually arranged in a plurality of different positions relative to each other.

In one embodiment according to the invention, the extremities 10, 10' are configured to be arranged in a number of fixed positions (steps) by means of corresponding mechanical structures providing a number of positions, in which the extremities 10, 10' are restricted from being moved unless a large force is applied, wherein the extremities 10, 10' are configured to be moved upon application of a smaller force when the extremities 10, 10' are not arranged in said number of fixed positions (steps).

In a preferred embodiment according to the invention, the extremities 10, 10' are configured to be steplessly positioned relative to each other.

It is preferred that the extremities 10, 10' can be moved relative to each other upon application of a force being larger than the force that is expected to be exerted upon the extremities 10, 10' when the gripping device 2 is used under normal conditions. A normal condition may be a condition in which the object experiences an acceleration in the range of 1-3 times gravity, g. This means that the friction between the engaging structures of the extremities 10, 10' and the corresponding structures (e.g. a shaft 8, 8' inside the fixation portions 4, 4') has a magnitude sufficiently large to ensure that the extremities 10, 10' will not move relative to the body portion 5 of the gripping device 2 as long as the object(s) being handled/lifted by the gripping device does not experience an acceleration in the range of 1-3 times gravity.

In a preferred embodiment according to the invention, the gripping device 2 comprises one or more adjustment structures (e.g. an adjustment screw) arranged and configured to adjust the friction between engaging structures of the extremities 10, 10' and the corresponding structures.

The gripping device 2 comprises a central portion 6 centrally arranged in the body portion 5. The central portion 6 constitutes a cover that protects an underlying structure formed as an attachment member configured to be detachably attached to a corresponding attachment structure provided on a robot (see FIG. 5C).

In FIG. 1A, the extremities are arranged parallel to the first lateral axis X or second lateral axis Y, respectively. The extremities are arranged in a manner in which the gripping device 2 takes up as little space as possible, as the extremities extend under/along the body portion 5 of the gripping device 2.

Although the gripping devices 2 shown in FIG. 1A and FIG. 1B comprise four extremities 10, 10', the number of extremities 10, 10' may be changed.

In one embodiment according to the invention, the gripping devices 2 shown comprise two extremities 10, 10'.

In another embodiment according to the invention, the gripping devices 2 shown comprise three extremities 10, 10'.

In another embodiment according to the invention, the gripping devices 2 shown comprise five extremities 10, 10'.

In another embodiment according to the invention, the gripping devices 2 shown comprise six or more extremities 10, 10'.

FIG. 2A illustrates a perspective top view of the gripping device 2 shown in FIG. 1A in another configuration, and FIG. 2B illustrates a perspective bottom view of the gripping device 2 shown in FIG. 1A in a configuration in which the extremities 10, 10' extend perpendicular to their adjacent extremity 10, 10'.

The gripping device 2 shown in FIG. 2A comprises two adjacent extremities 10, 10' that are rotated towards each other and the first lateral axis X of the gripping device 2. The gripping device 2, moreover, comprises two adjacent extremities 10", 10''' that are rotated towards each other and the first lateral axis X of the gripping device 2.

The extremities 10, 10', 10", 10''' are provided with suction members 12, 12' formed as suction discs. The extremities 10, 10', 10", 10''' are rotatably attached to fixation portions 4, 4' by means of shafts 8' extending perpendicular to the longitudinal axis Z of the gripping device 2, through the fixation portions 4, 4'.

In FIG. 2B, it can be seen that the shafts 8 extend through the fixation portions 4' of the body portion 5 of the gripping device 2. Moreover, it can be seen that the extremities 10, 10', 10", 10''' are provided with a plurality of inlets 18, 18'. The inlets 18, 18' are provided along the length of the extremities 10, 10', 10", 10''' and are configured to receive a suction member 12, 12 or alternatively a closure (see FIG. 4B or FIG. 5B) or an extension member (see FIG. 4C).

The gripping device 2 comprises a support portion 14 provided as a lower, centrally arranged part of the body portion 5 of the gripping device 2. The support portion 14 is arranged in an area provided between the shafts 8, about which the extremities 10, 10', 10", 10''' are rotatably mounted. An adjustment screw (not shown) may be arranged in a position, in which it allows for adjusting the friction between engaging structures of the extremities 10, 10', 10", 10''' and the fixation portions 4', to which the extremities 10, 10', 10", 10''' are rotatably attached. Hereby, it is possible to adjust the friction and thus ensure that the friction is sufficiently large to ensure that the extremities 10, 10', 10", 10''' do not move relative to each other during use of the gripping device 2.

The support portion 14 is provided with a plurality of inlets 18, 18', into which a suction member 12 is connected. Accordingly, the support portion 14 and the extremities 10, 10', 10", 10''' can carry a load when one or more objects are to be handled by using the gripping device 2 according to the invention.

The extremities 10, 10', 10", 10''' are formed as longitudinal structures comprising a distal portion provided with inlets 18, 18' and a proximal portion that is rotatably attached to a fixation portion 4' of the body portion 5 of the gripping device 2. The proximal portion is displaced (offset) relative to the distal portion, and thus a corner portion 16 is provided at the position in which the distal portion and the proximal portion of each extremity 10, 10', 10", 10''' are attached to each other. The corner portion 16 is shaped to allow the extremities 10, 10', 10", 10''' to be rotated to such an extent that the extremities 10, 10', 10", 10''' extend under the support portion 14. Hereby, the gripping device 2 can be folded to the highest possible extent.

Figure 3A:
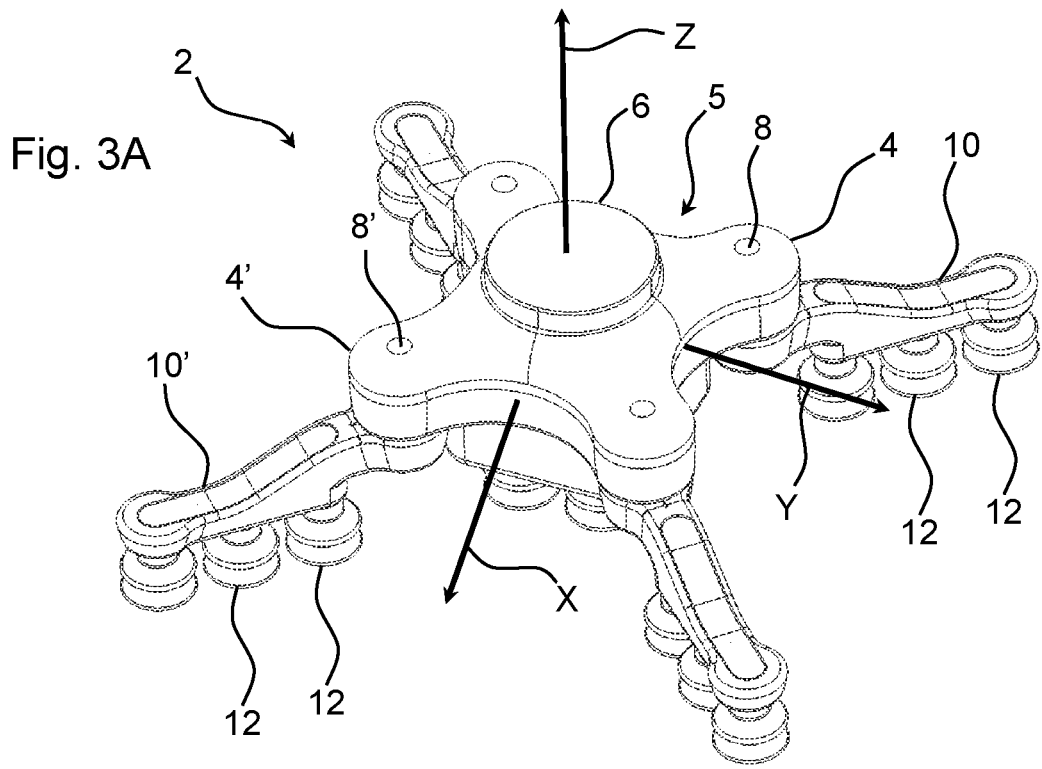
FIG. 3A shows a perspective top view of the gripping device shown in FIG. 2B.

FIG. 3A illustrates a perspective top view of the gripping device 2 shown in FIG. 2B. The gripping device 2 shown in FIG. 3A comprises four extremities 10, 10' extending perpendicular to each of the adjacent extremities 10, 10'. The extremities 10, 10' extend 45 degrees relative to the first lateral axis X and the second lateral axis Y of the gripping device 2. The distal portions of the extremities 10, 10' extend perpendicular to the longitudinal axis Z of the gripping device 2.

Figure 3B:
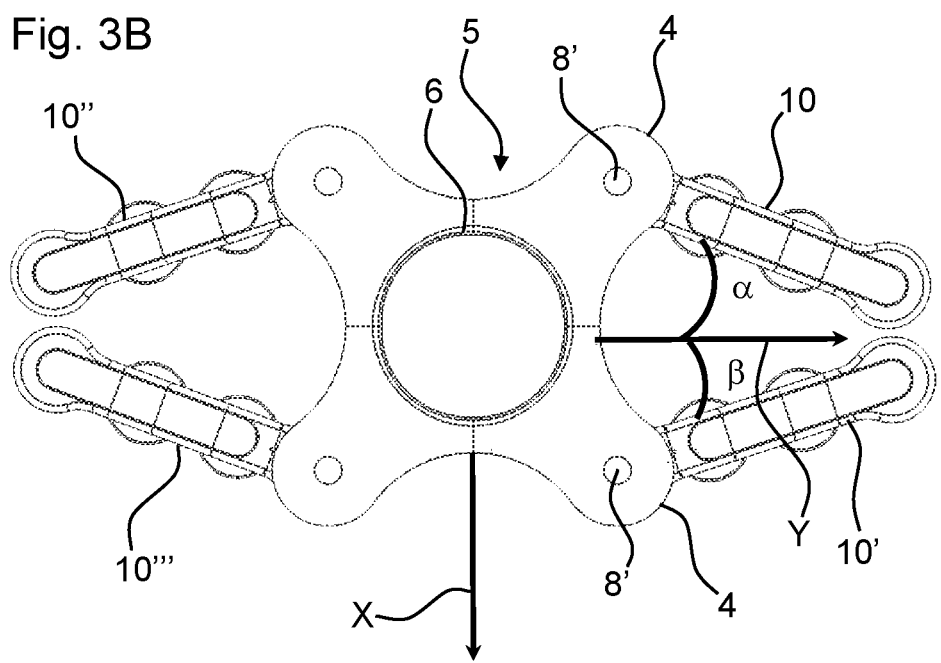
FIG. 3B shows a top view of the gripping device shown in FIG. 2A.

FIG. 3B illustrates a top view of the gripping device 2 shown in FIG. 2A. The gripping device 2 comprises two adjacent extremities 10, 10' that are rotated (about the shafts 8, 8' extending through the fixation portions 4, 4' of the body portion 5 of the gripping device 2) towards the second lateral axis Y of the gripping device 2. The angle α between the first extremity 10 and the second lateral axis Y of the gripping device 2 is indicated. Likewise, the angle β between the second extremity 10' and the second lateral axis Y of the gripping device 2 is indicated.

The gripping device 2 comprises two other adjacent extremities 10", 10'" that are rotated towards the second lateral axis Y of the gripping device 2.

FIG. 4A illustrates a cross-sectional view of a closure 48 used to close an inlet hole 34 in an extremity of a gripping device according to the invention. The closure 48 comprises a threaded portion 50 that is configured to be screwed into a corresponding threaded structure 52 of the inlet hole 34. By screwing the closure 48 into the inlet hole 34, it is possible to plug the inlet hole 34 and hereby prevent air from being sucked into the inlet hole 34 from outside.

FIG. 4B illustrates a cross-sectional view of an extension member 46 attached to an inlet hole 34 in an extremity of a gripping device according to the invention. The extension member 46 comprises a canal 56 through which air can be sucked into the inlet hole 34. A suction member (e.g. a suction disc) can be attached to the flange 54 provided in the distal end of the extension member 46.

The extension member 46 is provided with a threaded portion 50 configured to be screwed into a corresponding threaded structure 52 of the inlet hole 34.

Figure 5A:
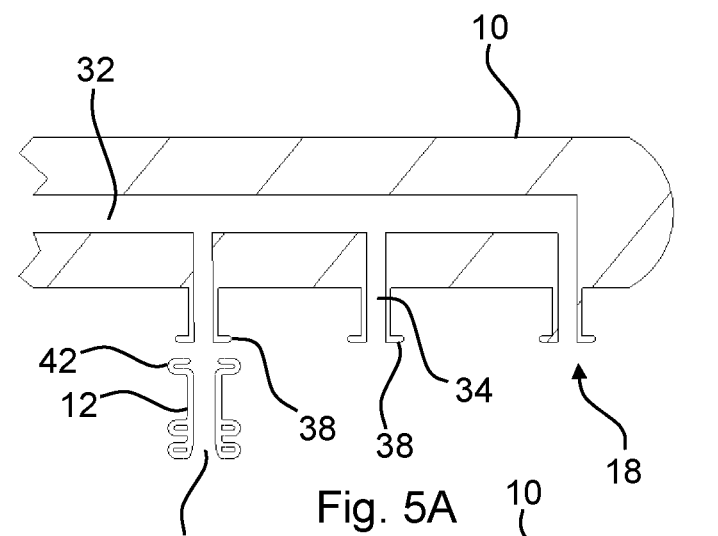
FIG. 5A shows a cross-sectional view of an extremity of a gripping device according to the invention.

FIG. 5A illustrates a cross-sectional view of an extremity 10 of a gripping device according to the invention. The extremity 10 comprises an air conduit 32 being in fluid communication with three inlet holes 34 distributed along the length of the distal portion of the extremity 10. Each inlet hole 34 is a portion of an inlet 18 provided with a flange 38 in the distal end of the inlet 18. A suction member 12 formed as a suction disc 12 is arranged below one of the inlets 18. The suction member 12 comprises a flange attachment 42 configured to be attached to the flange 38 of the inlet 18.

Figure 5B:
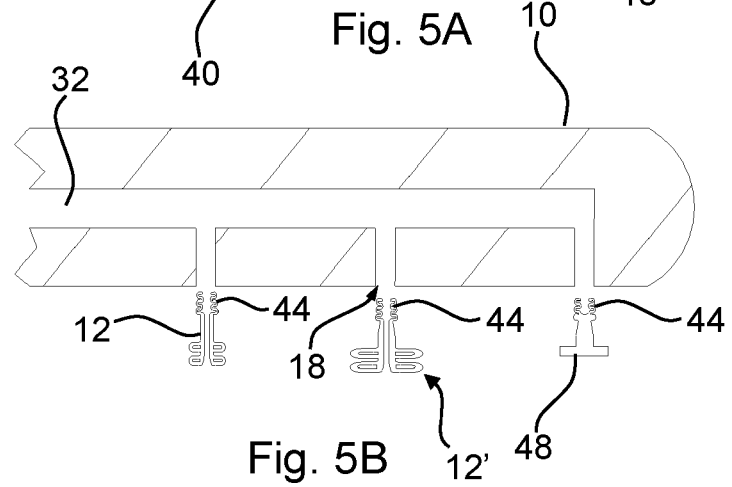
FIG. 5B shows a cross-sectional view of an extremity of a gripping device according to the invention.

FIG. 5B illustrates a cross-sectional view of an extremity 10 of a gripping device according to the invention. The extremity 10 comprises an air conduit 32 being in fluid communication with three inlets 18. A suction member 12 formed as a suction disc 12 is arranged below one of the inlets 18. Another suction member 12' formed as a suction disc 12 is arranged below one of the inlets 18. A closure 48 is arranged below one last inlet 18. The suction members 12, 12' and the closure 48 are provided with a corrugated portion 44 in their distal end. The corrugated portion 44 is configured to be sealingly inserted into the inlet 18.

Figure 5C:
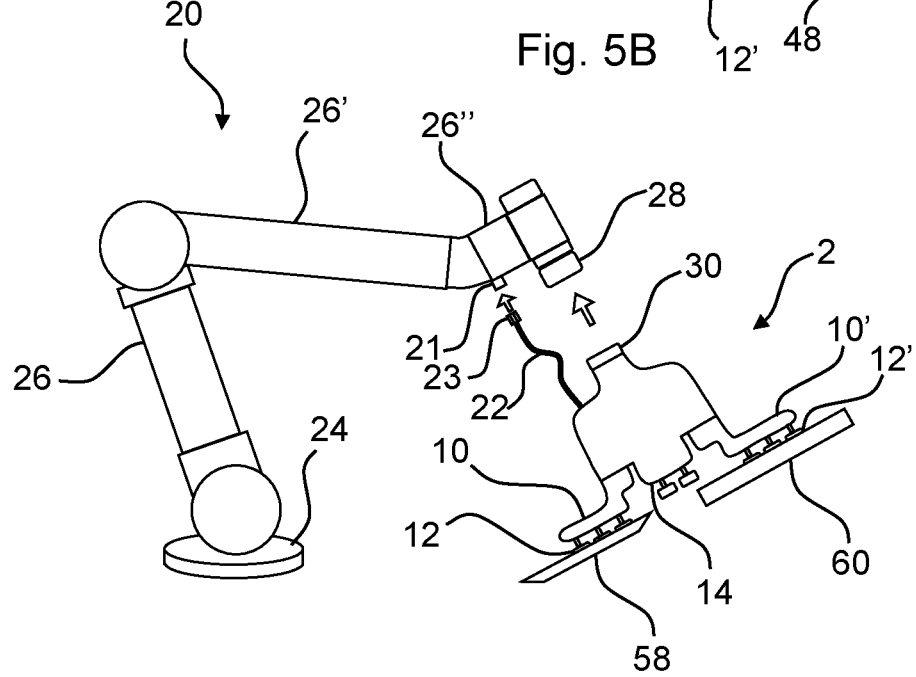
FIG. 5C shows a gripping device according to the invention being mounted on a collaborative robot.

FIG. 5C illustrates a gripping device 2 according to the invention being mounted on a collaborative robot 20. The robot 20 comprises a base 24 and a first arm 26 rotatably attached to said base 24. The robot 20 comprises a second arm 26' rotatably attached to the first arm 26. The robot 20 moreover comprises a third arm 26" rotatably attached to the second arm 26'. A first portion 28 is provided at the end of the third arm 26". The first portion 28 is configured to receive a corresponding second portion 30 attached to the gripping device 2. The first portion 28 and the corresponding second portion 30 may constitute a connector according to the invention (see FIG. 6A, FIG. 6B, FIG. 6C and FIG. 7A).

The robot 20 comprises a socket 21 configured to receive a corresponding plug 23 of the gripping device 2 in order to electrically connect the gripping device 2 and the robot 20. The plug 23 is attached at the distal end of a cable 22 connected to the gripping device 2. In another embodiment, an electrical connection structure may be applied as an alternative to the cable 22.

The gripping device 2 comprises a body portion and a plurality of extremities 10, 10' moveably attached to the body portion of the gripping device 2. The first extremity 10 is provided with a plurality of suction members 12 gripping a first object 58 by providing a negative pressure in the suction members 12.

The second extremity 10' is provided with a plurality of suction members 12' gripping a second object 60 by providing a negative pressure in the suction members 12'. The gripping device 2 comprises a centrally arranged support portion 14 provided with several suction members.

In one preferred embodiment according to the invention, the gripping device 2 is configured to control the pressure provided at different sections of the suctions members 12, 12' of the gripping device 2 independently of each other. This means that one portion of the gripping device 2 (e.g. the suction members 12 of a first section of the extremities 10, 10') are controlled differently than another portion of the gripping device 2 (e.g. the suction members 12' of a second section of the extremities 10, 10'). Hereby, it is possible to apply a single gripping device 2 to handle several objects 58, 60. This may be established by applying a gripping device 2 having a first valve (not shown) to control the pressure in the suction members 12 of a first section of the extremities 10, 10' and another valve (not shown) to control the pressure in the suction members 12' of another section of the extremities 10, 10'. The valves may be controlled by a control signal delivered by the robot 20 through the cable 22 or an electrical connection or wirelessly.

Accordingly, the gripping device 2 according to the invention may use one or more first extremities 10 to grip a first object being moved from a first working area to a second working area, whereas the gripping device 2 may use one or more other extremities 10' to grip a second object being moved from the second working area on the way back to the first working area.

Alternatively, the gripping device 2 may comprise several individually controlled pumps connected to different portions of the gripping device 2. Accordingly, the different pumps may be used to provide different pressure as function of time.

FIG. 6A illustrates a connector 70 according to the invention in closed configuration. The connector 70 comprises a first portion 74 configured to be (detachably or permanently) attached to a robot (see FIG. 5C) and a second portion 76 configured to be (detachably or permanently) attached to a gripping device according to the invention or to another device (not shown).

A plurality of screws 82, 82', 82", 82'" protrude from a central planar base structure of the first portion 74 of the connector 70. Likewise, a plurality of screws 84", 84'" protrude from a structure of the second portion 74 of the connector 70. The screws 82, 82', 82", 82''', 84", 84''' extend in extension of each other in a pairwise manner so that there is access through the connector 70, through the pairwisely corresponding screws 82, 82', 82", 82''', 84", 84'''. Accordingly, electrical connections (e.g. wires or cables with multiple wires), or tubes may be connected through said screws 82, 82', 82", 82''', 84", 84'''.

The first portion 74 and the second portion 76 are provided with corresponding engagement structures enabling an easy, fast and user-friendly attachment and detachment of said first portion 74 and second portion 76. A press element 78 is arranged to unlock the engagement structures from each other, when the connector 70 has to be disassemble (split into two pieces).

The connector 70 comprises a detachably attached adaptor 86 comprising a first part 88 and a second part 90. The first part 88 is provided with three holes 92 extending through the first part 88 and further extending through corresponding structures of the second part 90 hereby constituting holes 94. Accordingly, the adaptor 86 is adapted to connect pipes, wires or cables with multiple wires from a robot and the device being attached to the robot by means of the connector 70. Accordingly, by means of the adaptor 86, it is possible to connect electrical connections (by using electrical wires or cables with multiple wires) or tubes (e.g. air tubes) between said robot and device.

FIG. 6B shows the connector 70 shown in FIG. 6A in an open configuration, in which an air tube 100 extends through an adaptor configured to be detachably attached to the connector 70. The air tube 100 extends through a first fitting 96 protruding from a hole in first part 88 the adaptor. The air tube 100 further extends through a second fitting 98 protruding from a hole in second part 90 of the adaptor.

The first portion 74 and the second portion 76 are detachably attached to each other by means of a hinge (comprising a pivot and a structure rotatably attached thereto, see FIG. 7A). A slot 80 is provided in the outer structure of the first portion 74. The slot 80 is configured to receive the press element 78.

FIG. 6C shows the connector 70 shown in FIG. 6B in a closed configuration. The press element 78 is slideably arranged hereby allowing corresponding engagement structures of the first portion 74 and the second portion 76, respectively, to be brought out of engagement.

FIG. 7A shows a cross-sectional view of a connector 70 according to the invention. The connector 70 comprises a first portion 74 and a second portion 76. The second portion 76 comprises a protruding structure 102 that is brought into engagement with a corresponding receiving recess 106 provided in the first portion 74.

The protruding structure 102 is part of a slidably arranged press element (see FIG. 6A, FIG. 6B and FIG. 6C) provided in a track structure. A spring 104 is arranged in the end portion of the track structure and exerts an outwardly directed force on the press element. Hereby, the press element is kept in a locking engagement with the receiving recess 106 until the force is exceeded by an opposing directed force applied to press the press element in a direction towards the central portion of the connector 70. Hereby, the protruding structure 102 will be moved radially inwards and the protruding structure 102 will be brought out of engagement with the receiving recess 106.

The first portion 74 and the second portion 76 are detachably attached to each other by means of a hinge comprising a pivot 116 and a structure (not shown) rotatably and detachably attached to the pivot 116.

FIG. 7B illustrates a locking structure 66 according to the invention. The locking structure 66 comprises a bent arm 67 rotatably attached to a fixation portion 4, 4' of a body portion 5. The locking structure 66 can be arranged in an unlocked configuration, in which the bent arm 67 protrudes from the fixation portion 4, 4'. In this unlocked configuration, an extremity can be inserted into or be removed from the hole 63 in the fixation portion 4, 4'. In the unlocked configuration, an extremity can also be rotated hereby changing its position relative to the body portion 5 and thus the other extremities.

The locking structure 66 can be arranged in a locked configuration in which the bent arm 67 is received by the groove structure 5 provided in the fixation portion 4, 4'. In this locked configuration, the extremity cannot be rotated and thus its position relative to the body portion 5 cannot be changed.

FIG. 7C illustrates an engagement structure 118 of a first portion 74 rotatably attached to a pivot 116 of a second portion of a connector according to the invention. It can be seen that the engagement structure 118 enables rotation of the first portion 74 relative to the pivot 116 and thus the second portion of a connector. By initially bringing the engagement structure 118 of a first portion 74 into engagement with the pivot 116, it is possible to rotate the first portion relative to the second portion hereby bringing the connector from an open configuration (as shown in FIG. 6B) into a closed configuration (as shown in FIG. 6C).

It is possible to arrange the pivot 116 in the first portion of the connector and the engagement structure 118 in the second portion of the connector if desirable.

Figure 8C:
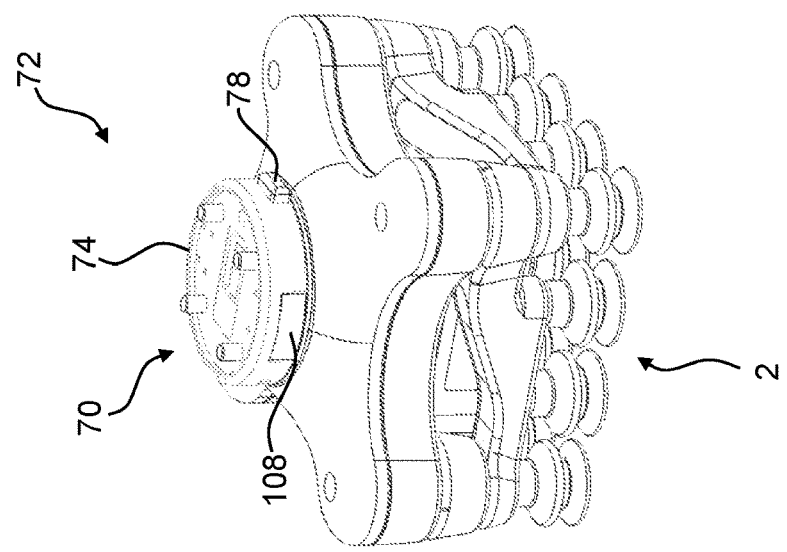
FIG. 8C shows the system shown in FIG. 8B, in a configuration in which the connector has been closed.
Figure 8B:
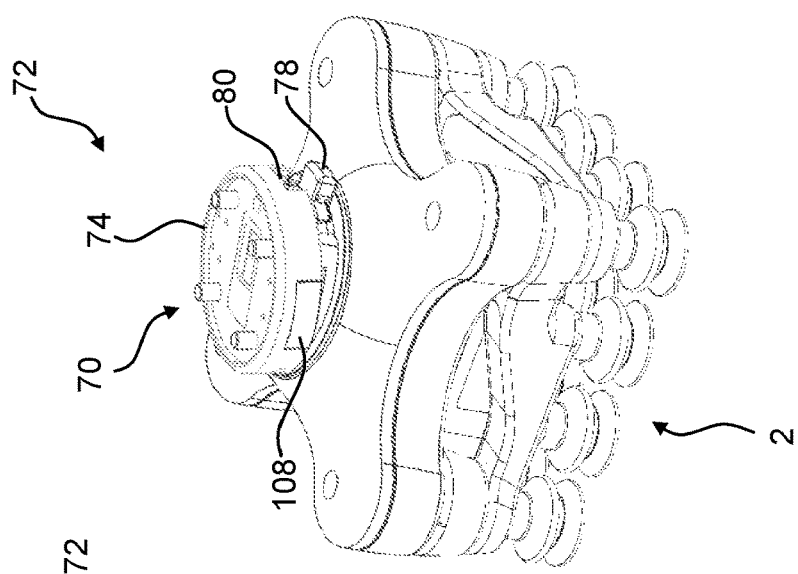
FIG. 8B shows the system shown in FIG. 8A, in a configuration in which the connector is being closed.
Figure 8A:
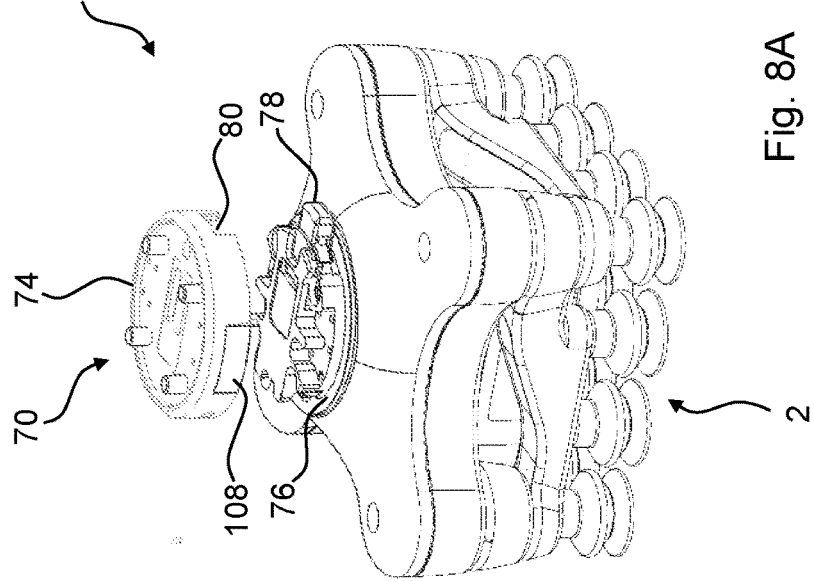
FIG. 8A shows a system comprising a gripping device according to the invention and a connector.

FIG. 8A illustrates a system 72 comprising a gripping device 2 according to the invention and a connector 70 corresponding to the one explained with reference to FIG. 6A, FIG. 6B, FIG. 6C and FIG. 7A. The connector 70 comprises a second portion 76 being attached to the gripping device 2. A slidably arranged press element 78 protrudes from the second portion 76.

The connector 70 comprises a first portion 74 configured to be attached to a robot like illustrated in FIG. 5C. The first portion 74 comprises a detachably attached plate 108 allowing mounting of an adaptor as explained with reference to FIG. 6A, FIG. 6B and FIG. 6C.

FIG. 8B illustrates the system 72 shown in FIG. 8A, in a configuration in which the connector 70 is being closed.

FIG. 8C illustrates the system 72 shown in FIG. 8B, in a configuration in which the connector 70 has been closed.

FIG. 9A illustrates a segmented extremity 10 according to the invention. The segmented extremity 10 comprises a joint 110 allowing the second segment 68' of the segmented extremity 10 to be rotated relative to the first segment 68 of the segmented extremity 10. The segmented extremity 10 is provided with suction members 12.

FIG. 9B illustrates another extremity 10 according to the invention. The fixation portion 4 is provided with a structure 112 configured to be received by a hole in the proximal portion of the extremity 10. The extremity 10 comprises a proximal portion provided with a dividing structure 114 formed as radially extending nots configured to receive corresponding radially extending protruding elements provided at the fixation portion 4 of the gripping device 2.

In another embodiment according to the invention, the extremity 10 comprises a proximal portion provided with a dividing structure 114 formed as radially extending protruding elements configured to receive corresponding radially extending nots provided at the fixation portion 4 of the gripping device 2.

By applying these corresponding engagement structures, it is possible to fix the extremity 10 in a plurality of position in which it takes a very large torque to rotate the extremity 10. Accordingly, the extremity 10 can be fixed in a predefined number of positions by simple mechanical engaging structures.

FIG. 9C illustrates a segmented extremity 10 according to the invention in a first straight configuration. The extremity 10 is configured to be detachably attached to the fixation portion 4 of a gripping device 2 according to the invention. The fixation portion 4 is provided with a structure 112 configured to be received by a hole in the proximal portion of the extremity 10. The extremity 10 comprises a first segment 68 and a second segment 68'.

FIG. 9D illustrates the segmented extremity 10 shown in FIG. 9C in another bent configuration. It can be seen that the second segment 68' can be rotated relative to the second segment 68' of the extremity 10 by means of a joint 110'. The second segment 68' can be rotated relative to the second segment 68' in a manner in which the second segment 68' and the second segment 68' does not extend in the same plane. This may be beneficial if the gripping device according to the invention is used to handle objects having several non-parallel surfaces.

FIG. 10A illustrates a cross-sectional view of a connector 70 according to the invention. The connector 70 comprises a first portion 74 and a second portion 76 attached thereto. The connector 70 comprises a pivot 116 arranged in one end of the connector 70 and a recess 106 provided in the first portion 74. The recess 106 is arranged in the opposite end of the connector 70 than the pivot 116.

The first portion 74 is provided with a protruding structure 102 provided in the end of a slidably arranged engagement structure. The engagement structure is slidably arranged in a track structure 136. The protruding structure 102 is configured to be brought into engagement with the recess 106 hereby locking the first portion 74 relative to the second portion 76. A spring 104 is arranged in the track structure 136 and abuts the end wall of the track structure 136. The spring 104 extends into a bore provided in the engagement structure. Accordingly, the spring 104 is arranged to exert a force that will keep the protruding structure 102 of the engagement structure in engagement with the recess 106.

FIG. 10B illustrates a close-up view of a portion of the connector 70 shown in FIG. 10A. It can be seen that the protruding structure 102 has a contact surface 132 bearing against a corresponding contact surface 134 of the first portion 74. The angle θ between the contact surface of the protruding structure 102 and the longitudinal axis X' of the slidably arranged engagement structure is indicated.

It can be seen that the angle θ is approximately 15 degrees. It is preferred that the angle θ is within the range 5-30 degrees, preferably approximately 15 degrees. Hereby, it is possible to achieve an engagement between the contact surfaces 132, 134 that will prevent the surface 134 of the first portion 74 to provide a force large enough to press the protruding structure 102 out of engagement with the recess 106 when a force is applied to separate the first portion 74 from the second portion 76.

The first portion 74 comprises an engagement structure 118 configured to be rotatably attached to a pivot 116 attached to the second portion 76.

Figure 11:
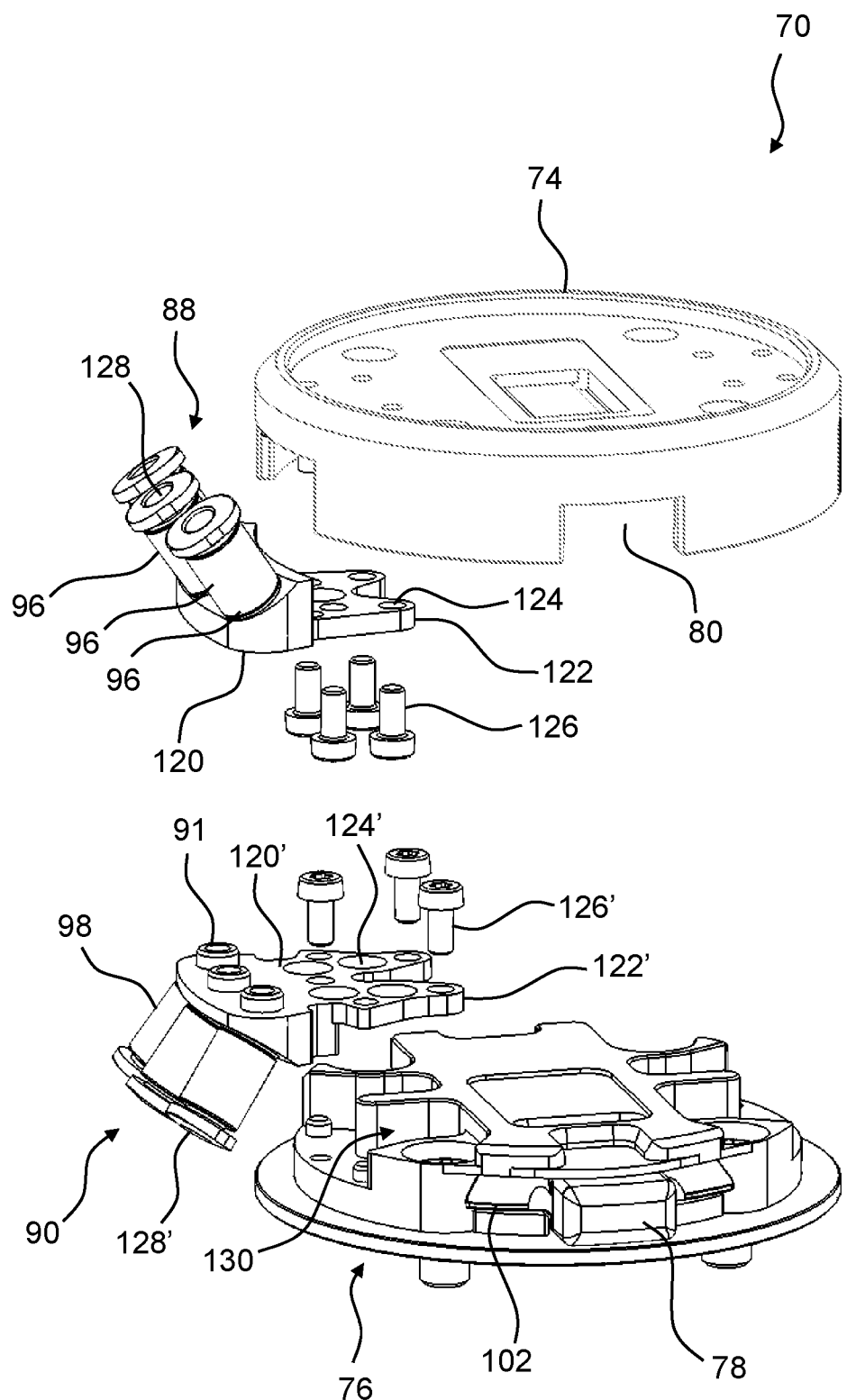
FIG. 11 shows an exploded view of a connector according to the invitation and an adaptor configured to be attached thereto.

FIG. 11 illustrates an exploded view of a connector 70 according to the invitation and an adaptor 86 configured to be attached thereto. The connector 70 comprises a second portion 76 provided with a slidably arranged slidably arranged engagement structure provided with a press element 78 in its distal end. The connector 70 comprises a first portion 74 provided with a slot 80 configured to receive the press element 78.

The first portion 74 is configured to be attached to a robot (as illustrates in FIG. 5C) and a second portion 76 configured to be attached to a device 2 configured to be connected to the robot. The first portion 74 and the second portion 76 are detachably attached to each other by means of a hinge comprising a pivot (116 shown in FIG. 10A) and an engagement structure (118 shown in FIG. 10A) rotatably attached thereto.

The adaptor 86 is configured to be attached to the connector 70 and comprises a first connection part 88 configured to be attached to the first portion 74 of the connector 70 and a second connection part 90 configured to be attached to the second portion 76 of the connector 70. The adapter 86 comprises a number of connection structures 91 configured to connect the distal end of a first pipe or cable with the distal end of a second pipe or cable.

The first connection part 88 comprises an attachment plate 122 provided with holes 124 for receiving screws 126. Hereby, the attachment plate 122 can be attached to the first portion 74 of the connector 70. Likewise, the second connection part 90 comprises an attachment plate 122' provided with holes 124' for receiving screws 126'. Hereby, the attachment plate 122' can be attached to the second portion 76 of the connector 70.

The first connection part 88 comprises a support structure 120 provided with three holes 92 for inserting the distal end of a first pipe or cable. Likewise, the second connection part 90 comprises a support structure 120' provided with three holes 94 for inserting the distal end of a second pipe or cable.

The connection structures 91 are arranged to connect the distal end of a first pipe or cable inserted through the one or more holes 92 in the support structure 120 of the of the first connection part 88 and the distal end of a second pipe or cable being inserted through the one or more holes 94 in the support structure 120' of the of the second connection part 90.

The first portion 74 comprises a protruding structure 102 that is configured to be brought into engagement with a corresponding receiving recess (106 shown in FIG. 10A) provided in the second portion 76. The second portion 76 is provided with two receiving structures 130 configured to receive a corresponding attachment plate 122, 122' of the adaptor 86.

Three fitting 96 extend from the holes 92 in the support structure 120 of the first connection part 88. Likewise, three fittings 98 extend from the holes 94 in the support structure 120' of the second connection part 90. The fittings 96, 98 are provided with through-going holes 128, 128' allowing insertion of a pipe or cable through said through-going holes 128, 128'.

It may be an advantage to have a connector 70 for mechanically connecting a device 2 to a robot 20, wherein the connector 70 comprises a first portion 74 configured to be attached to the robot 20 and a second portion 76 configured to be attached to a device 2 configured to be connected to the robot 20, wherein the first portion 74 and the second portion 76 are detachably attached to each other by means of a hinge comprising a pivot 116 and an engagement structure 118 rotatably attached thereto, wherein a) the first portion 74 comprises a protruding structure 102 that is configured to be brought into engagement with a corresponding receiving recess 106 provided in the second portion 76 or b) the second portion 76 comprises a protruding structure 102 that is configured to be brought into engagement with a corresponding receiving recess 106 provided in the first portion 74, wherein the protruding structure 102 and the receiving recess (106) constitute a mechanical locking structure.

It may be beneficial that the connector 70 comprises a detachably attached adaptor 86 comprising a first connection part 88 and a second part 90, wherein the adapter 86 comprises one or more connection structures 91 configured to connect the distal end of a first pipe 100 or cable with the distal end of a second pipe 101 or cable.

It may be an advantage that the first portion 74 and the second portion 76 are provided with corresponding engagement structures 102, 106 constituting a snap-fit connection.

It may be beneficial that the connector 70 comprises a slideably arranged press element 78 arranged to unlock the engagement structures 102, 106 from each other by pressing the press element 78.

Hereby, the press element 78 can be used to bring the engagement structures 102, 106 in a relative configuration in which the connector 70 can disassemble. This is important when the connector 70 has to be split into the first portion 74 and the second portion 76.

It may be an advantage that the connector 70 comprises a slideably arranged pull element arranged to unlock the engagement structures 102, 106 from each other by pulling the pull element.

Hereby, the first portion 74 and the second portion 76 may be brought out of engagement by means of the pull element.

It may be beneficial that the connector 70 comprises a rotatably arranged rotation element that is arranged to unlock the engagement structures 102, 106 from each other by rotating the rotation element. Hereby, the first portion 74 and the second portion 76 may be brought out of engagement by means of the rotation element.

It may be an advantage that the connector 70 is configured to receive one or more adaptors 86 hereby providing a detachably attachment of the one or more adaptors 86 to the connector 70.

It may be beneficial that the connector 70 comprises one or more receiving structures 130 configured to receive one or more corresponding attachment plates 122, 122' of the adaptor 86.

It may be an advantage that the connector 70 comprises a slot 80 provided in the outer structure of the first portion 74 or the second portion 76, wherein the slot 80 is configured to receive a press element 78, a rotation element or a pull element protruding from the first portion 74 or the second portion 76.

It may be beneficial that the first portion 74 comprises a protruding structure 102 that is configured to be brought into engagement with a corresponding receiving recess 106 provided in the second portion 76 or that the second portion 76 comprises a protruding structure 102 that is configured to be brought into engagement with a corresponding receiving recess 106 provided in the first portion 74.

It may be an advantage that the protruding structure 102 is part of a slidably arranged press element 78 provided in a track structure 136.

It may be beneficial that a spring 104 is arranged in the end portion of the track structure 136 and exerts an outwardly directed force on the press element 78.

Hereby, the press element 78 is kept in lockingly engagement with the receiving recess 106 until the force is exceeded by an opposing directed force applied to press the press element 78 into (e.g. in a direction towards the central portion of) the connector 70. Hereby, the protruding structure 102 will be moved radially inwards and the protruding structure 102 will be brought out of engagement with the receiving recess 106.

It may be an advantage that the first portion 74 comprises a detachably attached plate 108 allowing mounting of an adaptor 86 or that the second portion 76 comprises a detachably attached plate 108 allowing for mounting of an adaptor 86.

It may be beneficial that receiving recess 106 is provided in the opposite side of the connector 70 than the pivot 116.

It may be an advantage to have an adaptor 86 configured to be attached to a connector 70 comprising a first portion 74 configured to be attached to a robot 20 and a second portion 76 configured to be attached to a gripping device 2, wherein the adaptor 86 comprises a first connection part 88 configured to be attached to the first portion 74 of the connector 70 and a second connection part 90 configured to be attached to the second portion 76 of the connector 70, wherein the adapter 86 comprises one or more connection structures 91 configured to connect the distal end of a first pipe 100 or cable with the distal end of a second pipe 101 or cable.

The adaptor may comprise connection structures enabling that adjacent pipe ends, or adjacent cable ends can be connected. Hereby it is possible to apply the adaptor to establish connection between single wires, cables with multiple wires or pipes from the robot and the gripping device or an alternative device, respectively.

It may be beneficial that the first connection part 88 comprises an attachment plate 122 provided with holes 124 for receiving screws 126.

Hereby, the attachment plate 122 can be attached to the first portion 74 of the connector 70.

It may be an advantage that the second connection part 90 comprises an attachment plate 122' provided with holes 124' for receiving screws 126'.

Hereby, the attachment plate 122' can be attached to the second portion 76 of the connector 70.

It may be an advantage that the first connection part 88 comprises a support structure 120 provided with one or more holes 92 for inserting the distal end of a first pipe 100 or cable.

It may be beneficial that the second connection part 90 comprises a support structure 120' provided with one or more holes 94 for inserting the distal end of a second pipe 101 or cable.

It may be an advantage that the connection structures 91 are arranged to connect the distal end of a first pipe 100 or cable inserted through the one or more holes 92 in the support structure 120 of the of the first connection part 88 and the distal end of a second pipe 101 or cable being inserted through the one or more holes 94 in the support structure 120' of the of the second connection part 90.

It may be beneficial that a fitting 96 extends from one or more of the holes 92 in the support structure 120 of the first connection part 88 and/or that a fitting 98 extends from one or more of the holes 94 in the support structure 120' of the second connection part 90.

It may be an advantage that a fitting 96 extends from one or more of the holes 92 in the support structure 120 of the first connection part 88 and that a fitting 98 extends from one or more of the holes 94 in the support structure 120' of the second connection part 90.

It may be beneficial that the connection structures 91 are provided with sealing structures configured to establish an air tight connection between the distal end of a first pipe 100 inserted through a hole 92 in the support structure 120 of the of the first connection part 88 and the distal end of a second pipe 101 inserted a hole 94 in the support structure 120' of the of the second connection part 90.

It may be an advantage that the attachment plate 122 of the first portion 74 comprises a plane surface configured to abut against a corresponding plane surface of the attachment plate 122' of the second portion 76.

LIST OF REFERENCE NUMERALS

2 Gripping device
4, 4' Fixation portion
5 Body portion
6 Central portion
8, 8' Shaft
10, 10', 10", 10''' Extremity
12, 12 Suction member (e.g. suction disc)
14 Support portion
16, 16' Corner potion
18, 18' Inlet
20 Robot
21 Socket
22 Cable
23 Plug
24 Base
26, 26', 26" Arm
28 Attachment structure
30 Attachment member
32 Air conduit
34 Inlet hole
36 Inlet pipe
38 Flange
40 Canal
42 Flange attachment
44 Corrugated portion
46 Extension member
48 Closure
50 Threaded portion
52 Threaded structure
54 Flange
56 Canal
58 Object
60 Object
62 Pivot
63 Hole
64 Inner structure
65 Groove structure
66 Locking structure
67 Bent arm
68, 68' Segment
70 Connector
72 System
74 First portion
76 Second portion
78 Press element
80 Slot
82, 82', 82", 82''' Screw
84, 84', 84", 84''' Screw
86 Adaptor
88 First connection part
90 Second connection part
91 Connection structure
92, 94 Hole
96, 98 Fitting
100 Air tube
101 Air tube
102 Protruding structure
104 Spring
106 Receiving recess
108 Plate
110, 110' Joint
112 Structure
114 Dividing structure
116 Pivot
118 Engagement structure
120, 120' Support structure
122, 122' Attachment plate
124, 124' Hole
126, 126' Screw
128, 128' Hole
130 Receiving structure
132 Contact surface
134 Contact surface
136 Track structure
X, Y, Z, X' Axis
$\alpha, \beta, \theta$ Angle

The invention claimed is:

1. A gripping device configured to be detachably attached to a robot, wherein said gripping device comprises one or more extremities provided with one or more suction members connected to a vacuum source, wherein at least one of the one or more extremities is rotatably arranged, wherein at least one of the one or more extremities is configured to be rotated manually without using an actuator, wherein the gripping device comprises a body portion to which the extremities are moveably attached in such a manner that the friction between engaging structures of the extremities and corresponding structures of the body portion has a magnitude sufficiently large to ensure that the extremities cannot move relative to the body portion of the gripping device when an object is being handled by the gripping device and wherein at least one of the extremities is provided with one or more inlets.

2. A gripping device according to claim 1, wherein the gripping device comprises a body portion provided with one or more fixation portions, wherein one or more of the extremities are rotatably attached to a fixation portion.

3. A gripping device according to claim 1 wherein one or more of the extremities are provided with an air conduit being in fluid communication with one or more inlets.

4. A gripping device according to claim 1, wherein the gripping device comprises one or more integrated pumps.

5. A gripping device according to claim 1, wherein the gripping device comprises two or more valves configured to control the pressure at two or more separate groups of suction members.

6. A gripping device according to claim 1, wherein the gripping device comprises
  a) a connection cable or an electrical connection structure and is configured to be controlled by a robot by means of control signals sent via said connection cable or electrical connection structure or
  b) a receiver unit and is configured to be wirelessly controlled by an external device by means of wireless control signals received from said external device.

7. A gripping device according to claim 1, wherein the gripping device comprises an adjustment member for adjusting the friction between engaging structures of the extremities and corresponding structures of that part of the gripping device to which the extremities are moveably attached.

8. A gripping device according to claim 1, wherein the gripping device comprises one or more inlets provided with a threaded structure.

9. A gripping device according to claim 1, wherein the gripping device comprises a support portion, wherein the extremities are separated from the support portion, wherein the support portion constitutes a housing configured to contain a pump.

10. A system comprising a gripping device according to claim 1 and a connector comprising a first portion configured to be attached to a robot and a second portion configured to be attached to the gripping device.

11. A system according to claim 10, wherein the first portion and the second portion are detachably attached to each other by means of a hinge comprising a pivot and an engagement structure rotatably attached thereto, wherein
- a) the first portion comprises a protruding structure that is configured to be brought into engagement with a corresponding receiving recess provided in the second portion or
- b) the second portion comprises a protruding structure that is configured to be brought into engagement with a corresponding receiving recess provided in the first portion, wherein the protruding structure and the receiving recess constitute a mechanical locking structure.

* * * * *